United States Patent
Song

(10) Patent No.: US 12,520,497 B2
(45) Date of Patent: Jan. 6, 2026

(54) THREE-DIMENSIONAL FLASH MEMORY USING FERROELECTRIC LAYER ON BASIS OF BACK GATE STRUCTURE

(71) Applicant: SAMSUNG ELECTRONICS CO., LTD., Suwon-si (KR)

(72) Inventor: Yun Heub Song, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 350 days.

(21) Appl. No.: 18/005,875

(22) PCT Filed: Aug. 25, 2021

(86) PCT No.: PCT/KR2021/011384
§ 371 (c)(1),
(2) Date: Jan. 18, 2023

(87) PCT Pub. No.: WO2022/059956
PCT Pub. Date: Mar. 24, 2022

(65) Prior Publication Data
US 2023/0292523 A1    Sep. 14, 2023

(30) Foreign Application Priority Data

Sep. 15, 2020    (KR) .......................... 10-2020-0118494

(51) Int. Cl.
*G11C 11/22*    (2006.01)
*H10B 51/20*    (2023.01)
*H10B 51/30*    (2023.01)

(52) U.S. Cl.
CPC ............ *H10B 51/30* (2023.02); *G11C 11/223* (2013.01); *G11C 11/2273* (2013.01); *G11C 11/2275* (2013.01); *H10B 51/20* (2023.02)

(58) Field of Classification Search
CPC ...... H10B 51/30; H10B 51/20; G11C 11/223; G11C 11/2273; G11C 11/2275;
(Continued)

(56) References Cited

U.S. PATENT DOCUMENTS 10,665,604 B2    5/2020    Kimura et al.
11,127,862 B2    9/2021    Kwon et al.
(Continued)

FOREIGN PATENT DOCUMENTS

JP    2018207039 A    12/2018
JP    2019024087 A    2/2019
(Continued)

OTHER PUBLICATIONS

Jae-Min Sim et al., "Gate All around with Back Gate NAND Flash Structure for Excellent Reliability Characteristics in Program Operation", Electronics 2021, Jul. 30, 2021, pp. 1-6, vol. 10, Article No. 1828, https://www.mdpi.com/2079-9292/10/15/1828.
International Search Report for PCT/KR2021/011384 dated Dec. 3, 2021.
Notice of Allowance in Korean Appln. No. 10-2020-0118494, mailed on Feb. 28, 2023, 5 pages (with English translation).

*Primary Examiner* — Mohammed A Bashar
(74) *Attorney, Agent, or Firm* — Fish & Richardson P.C.

(57) ABSTRACT

Disclosed is a three-dimensional flash memory using a ferroelectric layer on the basis of a back gate structure. According to an embodiment, a three-dimensional flash memory comprises: a plurality of word liens extending on a substrate in a horizontal direction and sequentially stacked; and a plurality of strings extending through the plurality of word lines on the substrate in one direction, each of the plurality of strings including a channel layer extending in the one direction and a ferroelectric layer extending in the one direction to surround the channel layer, wherein a back gate extending in the one direction and an insulating layer extending in the one direction to surround the back gate are disposed inside the channel layer, and the channel layer and (Continued)

the ferroelectric layer constitute a plurality of memory cells corresponding to the plurality of word lines, wherein the ferroelectric layer is formed of a ferroelectric material and used as data storage by changing and maintaining the states of electric charges.

9 Claims, 45 Drawing Sheets

(58) Field of Classification Search
CPC ............ G11C 11/5628; G11C 11/5635; G11C 11/5642; G11C 11/5657; G11C 16/10; G11C 16/16; G11C 16/24; G11C 16/26; G11C 16/08; G11C 16/0483; H10D 30/60; H10D 30/701
See application file for complete search history.

(56) References Cited

U.S. PATENT DOCUMENTS

| | | | |
|---|---|---|---|
| 2011/0002172 A1* | 1/2011 | Kito | G11C 16/16 365/185.18 |
| 2017/0076808 A1 | 3/2017 | Sakui | |
| 2018/0138194 A1 | 5/2018 | Shigemura et al. | |
| 2019/0378858 A1 | 12/2019 | Goda et al. | |
| 2020/0227439 A1* | 7/2020 | Sato | H10B 51/10 |
| 2021/0398593 A1* | 12/2021 | Song | H10B 41/10 |

FOREIGN PATENT DOCUMENTS

| | | |
|---|---|---|
| KR | 10-2014-0086599 A | 7/2014 |
| KR | 10-2017-0093099 A | 8/2017 |
| KR | 10-2018-0113069 A | 10/2018 |
| KR | 10-2019-0011632 A | 2/2019 |
| KR | 10-2020-0051301 A | 5/2020 |

* cited by examiner

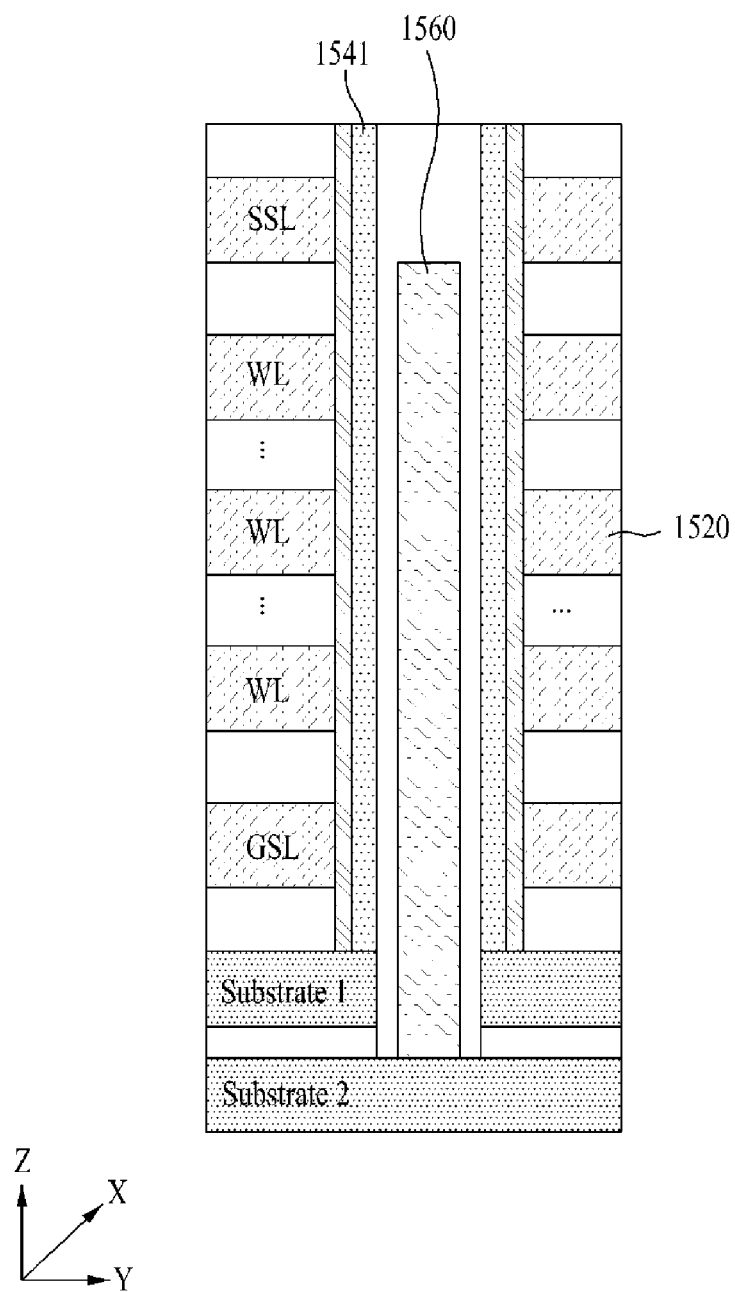

FIG. 16A
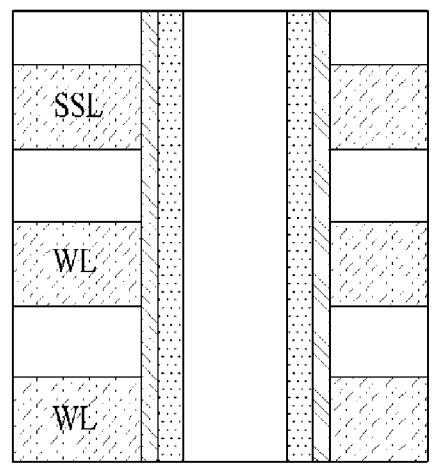
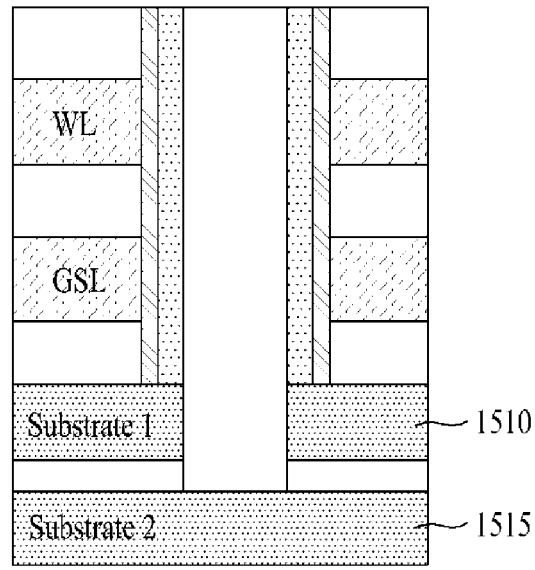
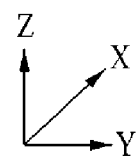

FIG. 16B
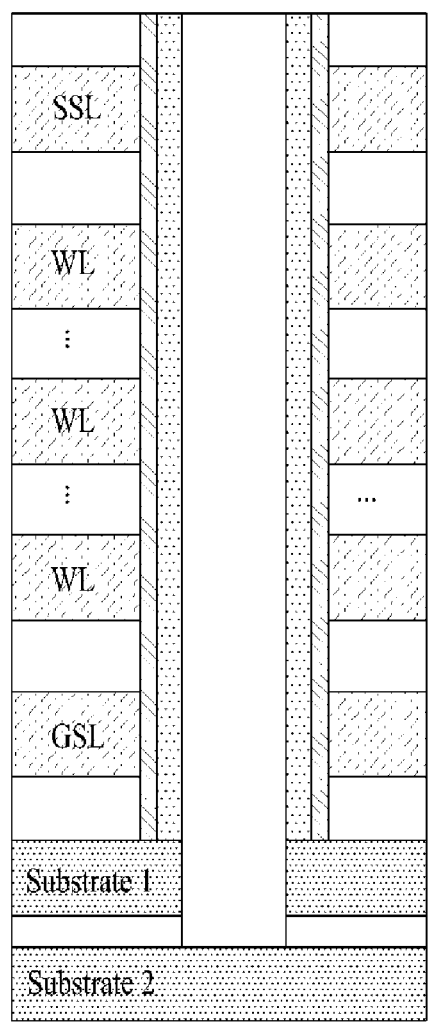
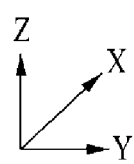

FIG. 18F
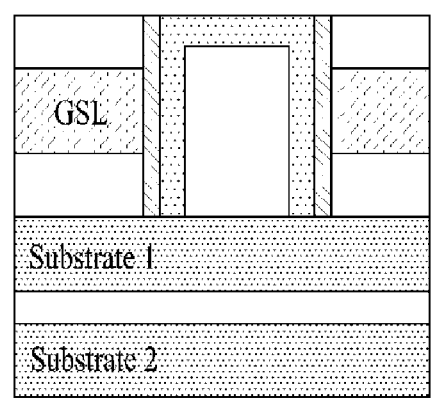
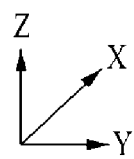

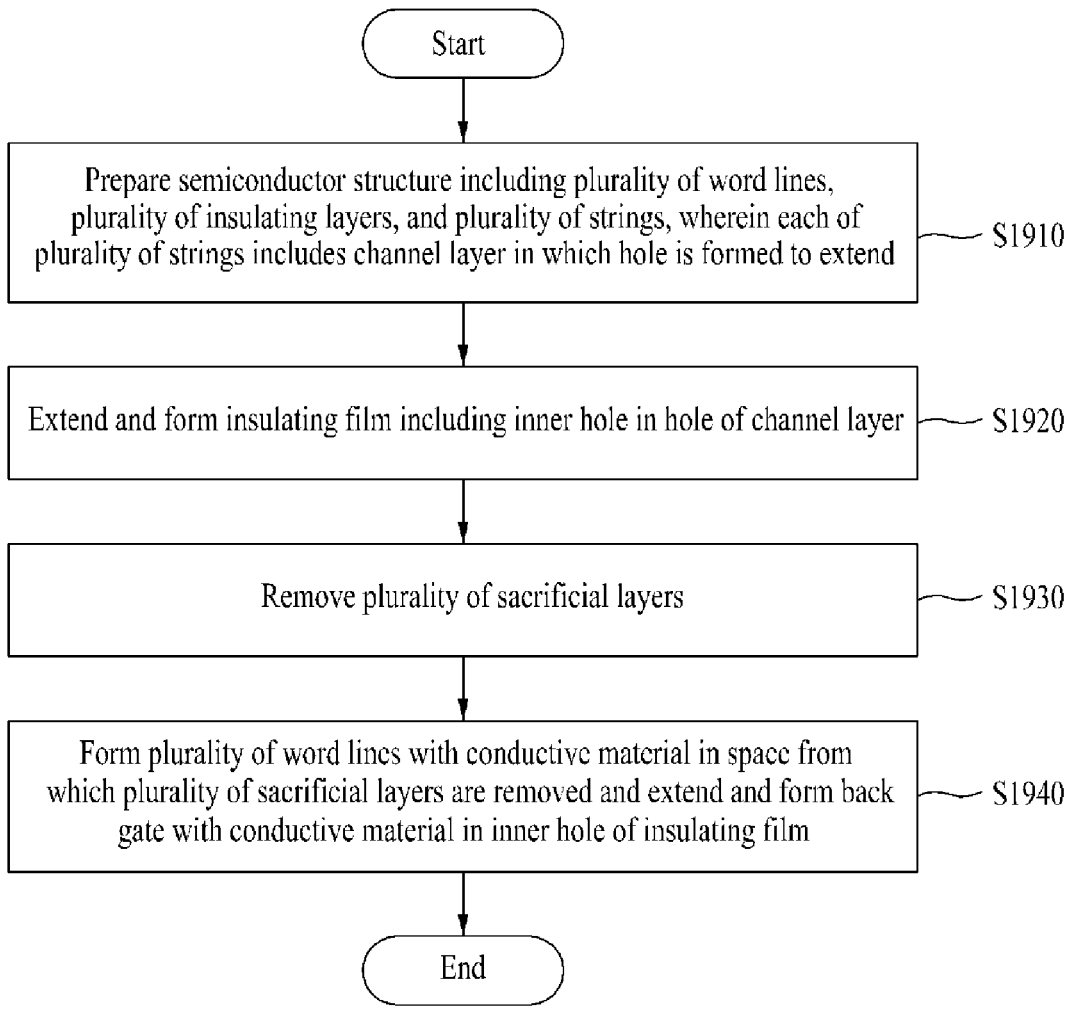

THREE-DIMENSIONAL FLASH MEMORY USING FERROELECTRIC LAYER ON BASIS OF BACK GATE STRUCTURE

CROSS REFERENCE TO RELATED APPLICATIONS

This application is a National Stage of International Application No. PCT/KR2021/011384 filed Aug. 25, 2021, claiming priority based on Korean Patent Application No. 10-2020-0118494 filed Sep. 15, 2020.

TECHNICAL FIELD

The following embodiments relate to a three-dimensional flash memory, and more particularly, to a three-dimensional flash memory using a ferroelectric layer on the basis of a back gate structure, and an operation method therefor.

BACKGROUND ART

Flash memory elements are electrically erasable programmable read only memories (EEPROMs), and the memories may be commonly used in, for example, computers, digital cameras, MP3 players, game systems, memory sticks, and the like. Such flash memory elements electrically control input/output of data by Fowler-Nordheim tunneling or hot electron injection.

In detail, referring to FIG. 1 illustrating a three-dimensional flash memory array according to the related art, the three-dimensional flash memory array may include a common source line CSL, a bit line BL, and a plurality of cell strings CSTR arranged between the common source line CSL and the bit line BL.

The bit lines are two-dimensionally arranged, and the plurality of cell strings CSTR are connected in parallel to the bit lines. The cell strings CSTR may be commonly connected to the common source line CSL. That is, the plurality of cell strings CSTR may be arranged between the plurality of bit lines and the one common source line CSL. In this case, a plurality of the common source lines CSL may be provided, and the plurality of common source lines CSL may be arranged two-dimensionally. Here, electrically the same voltage may be applied to the plurality of common source lines CSL or each of the common source lines CSL may be also electrically controlled.

Each of the cell strings CSTR may include a ground selection transistor GST connected to the common source line CSL, a string selection transistor SST connected to the bit line BL, and a plurality of memory cell transistors MCT arranged between the ground and string selection transistors GST and SST. Further, the ground selection transistor GST, the string selection transistor SST, and the memory cell transistors MCT may be connected in series.

The common source line CSL may be commonly connected to sources of the ground selection transistors GST. In addition, a ground selection line GSL, a plurality of word lines WL0 to WL3, and a plurality of spring selection lines SSL, which are arranged between the common source line CSL and the bit line BL, may be used as electrode layers of the ground selection transistor GST, the memory cell transistors MCT, and the string selection transistors SST. Further, each of the memory cell transistors MCT includes a memory element. Hereinafter, the string selection line SSL may be expressed as an upper selection line USL, and the ground selection line GSL may be expressed as a lower selection line LSL.

Meanwhile, in a three-dimensional flash memory according to the related art, in order to satisfy excellent performance and low price required by consumers, cells are vertically stacked, and thus the degree of integration increases.

For example, referring to FIG. 2 illustrating a structure of the three-dimensional flash memory according to the related art, the three-dimensional flash memory according to the related art is manufactured by arranging an electrode structure 215, in which interlayer insulating layers 211 and horizontal structures 250 are alternately and repeatedly formed, on a substrate 200. The interlayer insulating layers 211 and the horizontal structures 250 may extend in a first direction. The interlayer insulating layers 211 may be, for example, a silicon oxide film, and the lowermost interlayer insulating layer 211a among the interlayer insulating layers 211 may have a thickness lower than those of the other interlayer insulating layers 211. Each of the horizontal structures 250 may include first and second blocking insulating films 242 and 243 and an electrode layer 245. A plurality of the electrode structures 215 are provided, and the plurality of electrode structures 215 may be arranged to face each other in a second direction intersecting the first direction. The first and second directions may correspond to an X axis and a Y axis of FIG. 2, respectively. Trenches 240 spacing the plurality of electrode structures 215 apart from each other may extend between the plurality of electrode structures 215 in the first direction. Highly doped impurity regions may be formed in the substrate 200 exposed by the trenches 240, and thus the common source line CSL may be disposed. Although not illustrated, isolation insulating films filling the trenches 240 may be further arranged.

Vertical structures 230 passing through the electrode structures 215 may be arranged. As an example, in a plan view, the vertical structures 230 may be arranged in a matrix form while being aligned in the first and second directions. As another example, the vertical structures 230 may be aligned in the second direction and may be arranged in a zigzag form in the first direction. Each of the vertical structures 230 may include a protective film 224, a charge storage film 225, a tunnel insulating film 226, and a channel layer 227. As an example, the channel layer 227 may be disposed in a hollow tube shape therein, and in this case, a buried film 228 filling an inside of the channel layer 227 may be further disposed. A drain region D may be disposed on the channel layer 227 and a conductive pattern 229 may be formed on the drain region D and may be connected to the bit line BL. The bit line BL may extend in a direction intersecting the horizontal electrodes 250, for example, in the second direction. As an example, the vertical structures 230 aligned in the second direction may be connected to the one bit line BL.

The first and second blocking insulating films 242 and 243 included in the horizontal structures 250 and the charge storage film 225 and the tunnel insulating film 226 included in the vertical structures 230 may be defined as oxide-nitride-oxide (ONO) layers that are information storage elements of the three-dimensional flash memory. That is, some of the information storage elements may be included in the vertical structures 230, and the other thereof may be included in the horizontal structures 250. As an example, among the information storage elements, the charge storage film 225 and the tunnel insulating film 226 may be included in the vertical structures 230, and the first and second blocking insulating films 242 and 243 may be included in the horizontal structures 250.

Epitaxial patterns 222 may be arranged between the substrate 200 and the vertical structures 230. The epitaxial patterns 222 connect the substrate 200 and the vertical structures 230. The epitaxial patterns 222 may be in contact with at least one layer of the horizontal structures 250. That is, the epitaxial patterns 222 may be arranged in contact with a lowermost horizontal structure 250a. According to another embodiment, the epitaxial patterns 222 may be arranged in contact with a plurality of layers, for example, two layers, of the horizontal structures 250. Meanwhile, when the epitaxial patterns 222 are arranged in contact with the lowermost horizontal structure 250a, the lowermost horizontal structure 250a may be thicker than the other horizontal structures 250. The lowermost horizontal structure 250a in contact with the epitaxial patterns 222 may correspond to the ground selection line GSL of the three-dimensional flash memory array described with reference to FIG. 1, and the other horizontal structures 250 in contact with the vertical structures 230 may correspond to the plurality of word lines WL0 to WL3.

Each of the epitaxial patterns 222 has a recessed side wall 222a. Accordingly, the lowermost horizontal structure 250a in contact with the epitaxial patterns 222 is disposed along a profile of the recessed side wall 222a. That is, the lowermost horizontal structure 250a may be disposed in an inwardly convex shape along the recessed side walls 222a of the epitaxial patterns 222.

The three-dimensional flash memory having such a structure has a problem in that cell characteristics and reliability are degraded due to an increase in the number of vertical memory cells.

Thus, the following embodiments are intended to propose technologies for improving the cell characteristics and reliability.

DETAILED DESCRIPTION OF THE INVENTION

Technical Problem

Embodiments propose a three-dimensional flash memory having improved cell characteristics and reliability as well as improved horizontal scaling.

In more detail, embodiments propose a three-dimensional flash memory in which a ferroelectric layer disposed between a plurality of word lines and a channel layer is used as data storage in a structure in which a back gate is formed inside the channel layer.

Technical Solution

According to an embodiment, a three-dimensional flash memory includes a plurality of word lines extending in a horizontal direction on a substrate and sequentially stacked, and a plurality of strings extending in one direction on the substrate through the plurality of word lines, each of the plurality of strings including a channel layer extending in the one direction and a ferroelectric layer extending in the one direction to surround the channel layer, a back gate extending in the one direction and an insulating film extending in the one direction to surround the back gate being arranged inside the channel layer, and the channel layer and the ferroelectric layer constituting a plurality of memory cells corresponding to the plurality of word lines, wherein the ferroelectric layer is used as data storage by changing and maintaining states of charges while being formed of a ferroelectric material.

According to an aspect, the back gate may be used for applying a voltage for changing and maintaining the states of the charges of the ferroelectric layer in a memory operation of the three-dimensional flash memory.

According to another aspect, a pass voltage that allows only a target memory cell to be programmed may be applied to the back gate included in each of the plurality of strings during a program operation of the three-dimensional flash memory on the basis of a negative program voltage applied to a word line corresponding to the target memory cell subjected to the program operation among the plurality of word lines and voltages applied to a plurality of bit lines respectively connected to the plurality of strings.

According to still another aspect, during the program operation, at least one word line corresponding to at least one other memory cell except for the target memory cell among the plurality of word lines may float on the basis of the pass voltage applied to the back gate.

According to yet another aspect, during an erasure operation of the three-dimensional flash memory, at least one back gate included in at least one selected string that is subjected to the erasure operation among the plurality of strings may float so that memory cells included in the at least one selected string are erased on the basis of an erasure voltage applied to each of the plurality of word lines and a voltage applied to at least one bit line connected to the at least one selected string.

According to yet another aspect, during an erasure operation of the three-dimensional flash memory, a pass voltage that prevents memory cell in at least one non-selected string from being erased may be applied to at least one back gate included in the at least one non-selected string except for the at least one selected string that is subjected to the erasure operation among the plurality of strings on the basis of an erasure voltage applied to each of the plurality of word lines and a voltage applied to at least one bit line connected to the at least one non-selected string.

According to yet another aspect, during a reading operation of the three-dimensional flash memory, a negative voltage at which only a target memory cell is read may be applied to a back gate included in a selected string including the target memory cell that is subjected to the reading operation among the plurality of strings on the basis of a reading voltage applied to a word line corresponding to the target memory cell among the plurality of word lines, a pass voltage applied to at least one word line corresponding to at least one other memory cell except for the target memory cell among the plurality of word lines, and a voltage applied to a bit line connected to the selected string.

According to yet another aspect, during a reading operation of the three-dimensional flash memory, a back gate included in a selected string including a target memory cell that is subjected to the reading operation among the plurality of strings may float so that only the target memory cell is read on the basis of a reading voltage applied to a word line corresponding to the target memory cell among the plurality of word lines, a pass voltage applied to at least one word line corresponding to at least one other memory cell except to the target memory cell among the plurality of word lines, and a voltage applied to a bit line connected to the selected string.

According to yet another aspect, the pass voltage that prevents memory cells included in at least one non-selected string from being read may be applied to at least one back gate included in the at least one non-selected string except for the selected string among the plurality of strings during the reading operation on the basis of the reading voltage applied to a word line corresponding to the target memory cell among the plurality of word lines, the pass voltage applied to at least one word line corresponding to at least one other memory cell except for the target memory cell among the plurality of word lines, and the voltage applied to at least one bit line connected to the at least one non-selected string.

According to yet another aspect, the insulating film may have the same EOT (Equivalent Oxide Thickness) as that of the ferroelectric layer.

According to yet another aspect, during a reading operation of the three-dimensional flash memory, a reading voltage at which only the target memory cell is read may be applied to a back gate included in the selected string including the target memory cell that is subjected to the reading operation among the plurality of strings on the basis of the reading voltage applied to a word line corresponding to the target memory cell among the plurality of word lines, a pass voltage applied to at least one word line corresponding to at least one other memory cell except for the target memory cell among the plurality of word lines, and a voltage applied to a bit line connected to the selected string.

According to an embodiment, a method for a program operation of a three-dimensional flash memory including a plurality of word lines extending in a horizontal direction on a substrate and sequentially stacked, and a plurality of strings extending in one direction on the substrate through the plurality of word lines, each of the plurality of strings including a channel layer extending in the one direction and a ferroelectric layer extending in the one direction to surround the channel layer, a back gate extending in the one direction and an insulating film extending in the one direction to surround the back gate being arranged inside the channel layer, and the channel layer and the ferroelectric layer constituting a plurality of memory cells corresponding to the plurality of word lines, wherein the ferroelectric layer is used as data storage by changing and maintaining states of charges while being formed of a ferroelectric material includes applying a pass voltage at which only a target memory cell is programed to the back gate included in each of the plurality of strings on the basis of a negative program voltage applied to a word line corresponding to the target memory cell that is subjected to the program operation among the plurality of word lines and voltages applied to a plurality of bit lines respectively connected to the plurality of strings, and performing the program operation on the target memory cell in response to the application of the pass voltage to the back gate.

According to an embodiment, a method for an erasure operation of a three-dimensional flash memory including a plurality of word lines extending in a horizontal direction on a substrate and sequentially stacked, and a plurality of strings extending in one direction on the substrate through the plurality of word lines, each of the plurality of strings including a channel layer extending in the one direction and a ferroelectric layer extending in the one direction to surround the channel layer, a back gate extending in the one direction and an insulating film extending in the one direction to surround the back gate being arranged inside the channel layer, and the channel layer and the ferroelectric layer constituting a plurality of memory cells corresponding to the plurality of word lines, wherein the ferroelectric layer is used as data storage by changing and maintaining states of charges while being formed of a ferroelectric material includes allowing at least one back gate included in at least one selected string to float so that memory cells included in the at least one selected string are erased on the basis of an erasure voltage applied to each of the plurality of word lines and a voltage applied to at least one bit line connected to the at least one selected string that is subjected to the erasure operation among the plurality of strings, and performing the erasure operation on the at least one selected string in response that the at least one back gate included in the at least one selected string floats.

According to an aspect, the allowing of the at least one back gate included in the at least one selected string to float includes applying a pass voltage, which prevents memory cells included in at least one non-selected string from being erased, to the at least one back gate included in the at least one non-selected string, on the basis of the erasure voltage applied to each of the plurality of word lines and a voltage applied to at least one bit line connected to the at least one non-selected string except for the at least one selected string among the plurality of strings.

According to an embodiment, a method for a reading operation of a three-dimensional flash memory comprising a plurality of word lines extending in a horizontal direction on a substrate and sequentially stacked, and a plurality of strings extending in one direction on the substrate through the plurality of word lines, each of the plurality of strings including a channel layer extending in the one direction and a ferroelectric layer extending in the one direction to surround the channel layer, a back gate extending in the one direction and an insulating film extending in the direction to surround the back gate being arranged inside the channel layer, and the channel layer and the ferroelectric layer constituting a plurality of memory cells corresponding to the plurality of word lines, wherein the ferroelectric layer is used as a data storage by changing and maintaining states of charges while being formed of a ferroelectric material includes applying a negative voltage at which only a target memory cell is read to the back gate included in the selected string or allowing the back gate included in the selected string so that the only target memory cell is read, on the basis of a reading voltage applied to a word line corresponding to the target memory cell that is subjected to the reading operation among the plurality of word lines, a pass voltage applied to at least one word line corresponding to at least one other memory cell except for the target memory cell among the plurality of word lines, and a voltage applied to a bit line connected to the selected string including the target memory cell among the plurality of strings, and performing the reading operation on the target memory cell in response that the negative voltage is applied to the back gate included in the selected string or the back gate included in the selected string floats.

According to an aspect, the applying of the negative voltage to the back gate included in the selected string or allowing the back gate included in the selected string to float may include applying the pass voltage that prevents memory cells included in the at least one non-selected string from being read to the at least one back gate included in the at least one non-selected string on the basis of a reading voltage applied to a word line corresponding to the target memory cell among the plurality of word lines, a pass voltage applied to at least one word line corresponding to at least one other memory cell except for the target memory cell among the plurality of word lines, and a voltage applied to at least one bit line connected to at least one non-selected string except for the selected string among the plurality of strings.

According to an embodiment, a method for a reading operation of a three-dimensional flash memory comprising a plurality of word lines extending in a horizontal direction on a substrate and sequentially stacked, and a plurality of strings extending in one direction on the substrate through the plurality of word lines, each of the plurality of strings including a channel layer extending in the one direction and a ferroelectric layer extending in the one direction to surround the channel layer, a back gate extending in the one direction and an insulating film extending in the one direction to surround the back gate being arranged inside the channel layer, and the channel layer and the ferroelectric layer constituting a plurality of memory cells corresponding to the plurality of word lines, wherein the ferroelectric layer is used as a data storage by changing and maintaining states of charges while being formed of a ferroelectric material, the insulating film having the same EOT as the ferroelectric layer includes applying the reading voltage, by which only the target memory cell is read, to the back gate included in the selected string on the basis of a reading voltage applied to a word line corresponding to the target memory cell that is subjected to the reading operation among the plurality of word lines, a pass voltage applied to at least one word line corresponding to at least one other memory cell except for the target memory cell among the plurality of word lines, and a voltage applied to a bit line connected to the selected string including the target memory cell among the plurality of strings, and performing the reading operation on the target memory cell in response that the reading voltage is applied to the back gate included in the selected string.

Advantageous Effects of the Invention

Embodiments may propose a three-dimensional flash memory having improved cell characteristics and reliability as well as improved horizontal scaling.

In more detail, embodiments may propose a three-dimensional flash memory in which a ferroelectric layer disposed between a plurality of word lines and a channel layer is used as data storage in a structure in which a back gate is formed inside the channel layer.

DESCRIPTION OF THE DRAWINGS

FIGS. 15A to 15D are Y-Z cross-sectional views for describing a first implementation of the method for manufacturing the three-dimensional flash memory illustrated in FIG. 14.

FIGS. 16A and 16B are Y-Z cross-sectional views for describing a second implementation of the method for manufacturing the three-dimensional flash memory illustrated in FIG. 14.

FIGS. 18A to 18K are Y-Z cross-sectional views for describing an implementation of the method for manufacturing the three-dimensional flash memory illustrated in FIG. 17.

FIG. 19 is a flowchart illustrating a method of manufacturing a three-dimensional flash memory according to still another embodiment.

BEST MODE

Figure 1:
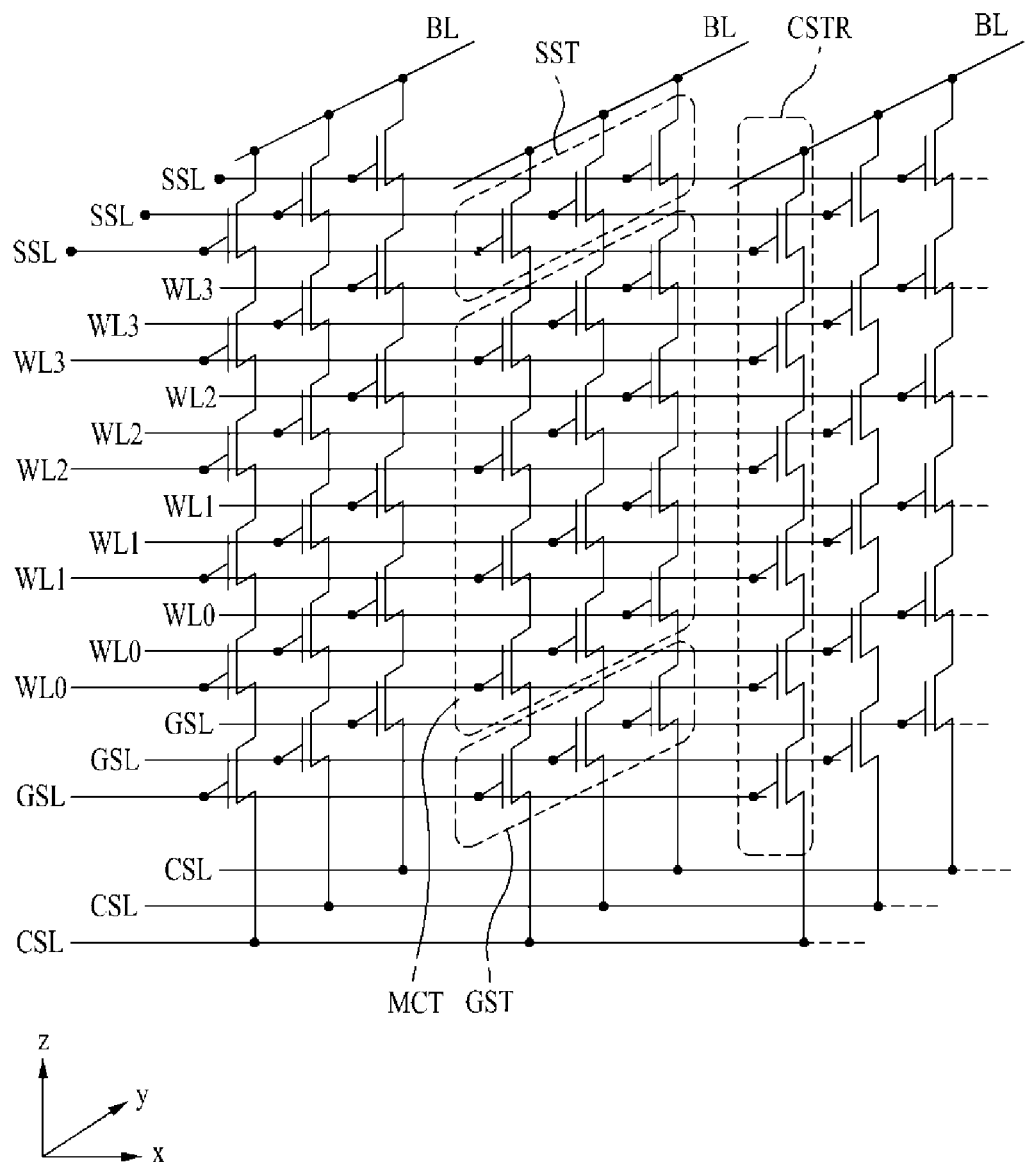
FIG. 1 is a schematic circuit diagram illustrating a three-dimensional flash memory array according to the related art.

Hereinafter, embodiments will be described in detail with reference to the accompanying drawings. However, the present disclosure is not restricted or limited by the embodiments. Further, the same reference numerals in each drawing indicate the same components.

Further, terms used in the present specification are used to properly express the embodiments of the present disclosure, and the terms may change depending on the intention of a user or an operator or customs in the field to which the present disclosure belongs. Therefore, definitions of the present terms should be made based on the contents throughout the present specification.

Figure 2:
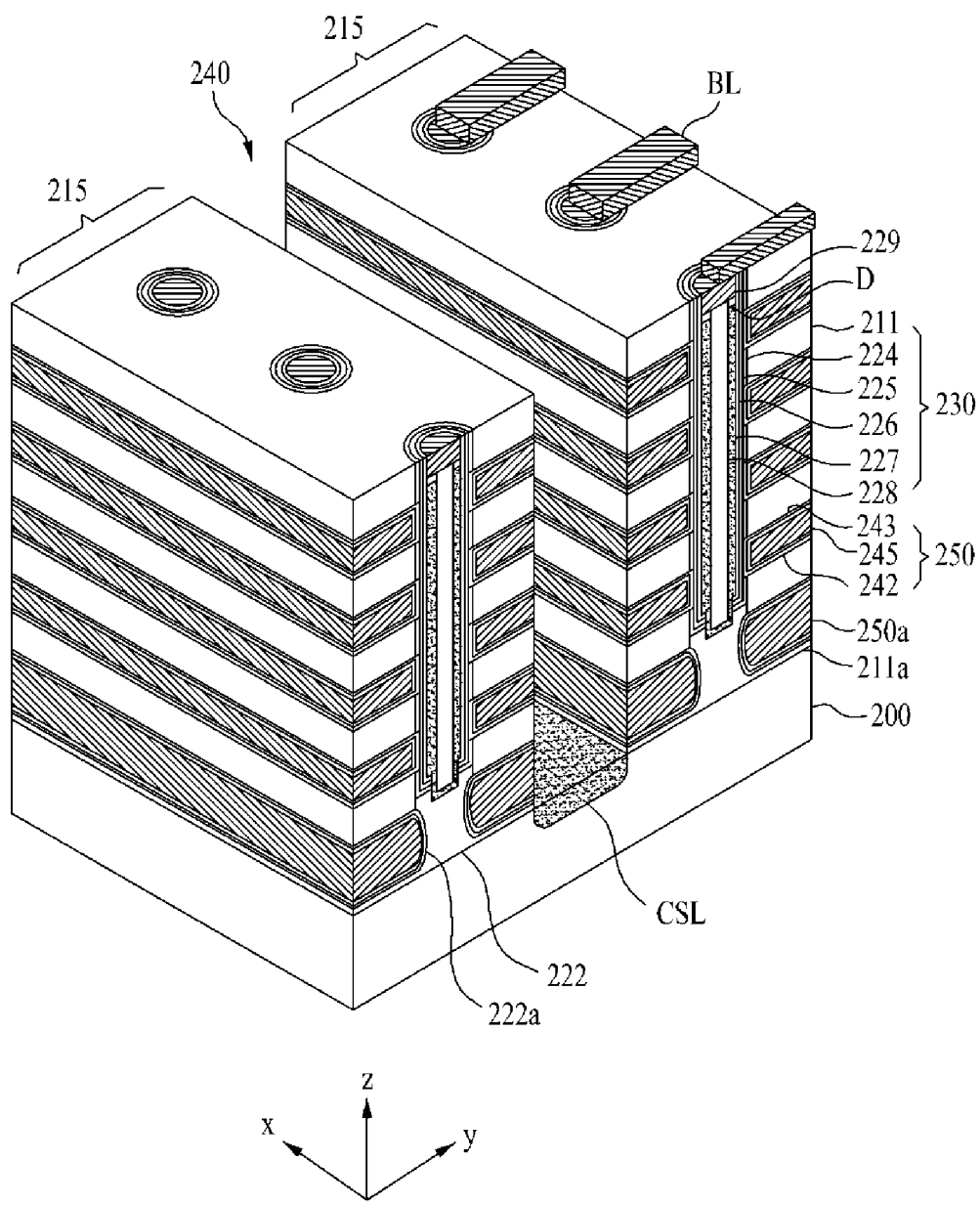
FIG. 2 is a perspective view illustrating a three-dimensional flash memory structure according to the related art.

Hereinafter, in a Y-Z cross-sectional view illustrating the three-dimensional flash memory, for convenience of description, the three-dimensional flash memory may be illustrated and described while components such as bit lines positioned above a plurality of strings and source lines positioned below the plurality of strings are omitted. However, the three-dimensional flash memory, which will be described below, is not restricted and limited thereto, and may further include an additional component on the basis of a structure of the three-dimensional flash memory illustrated with reference to FIG. 2.

Figure 3A:
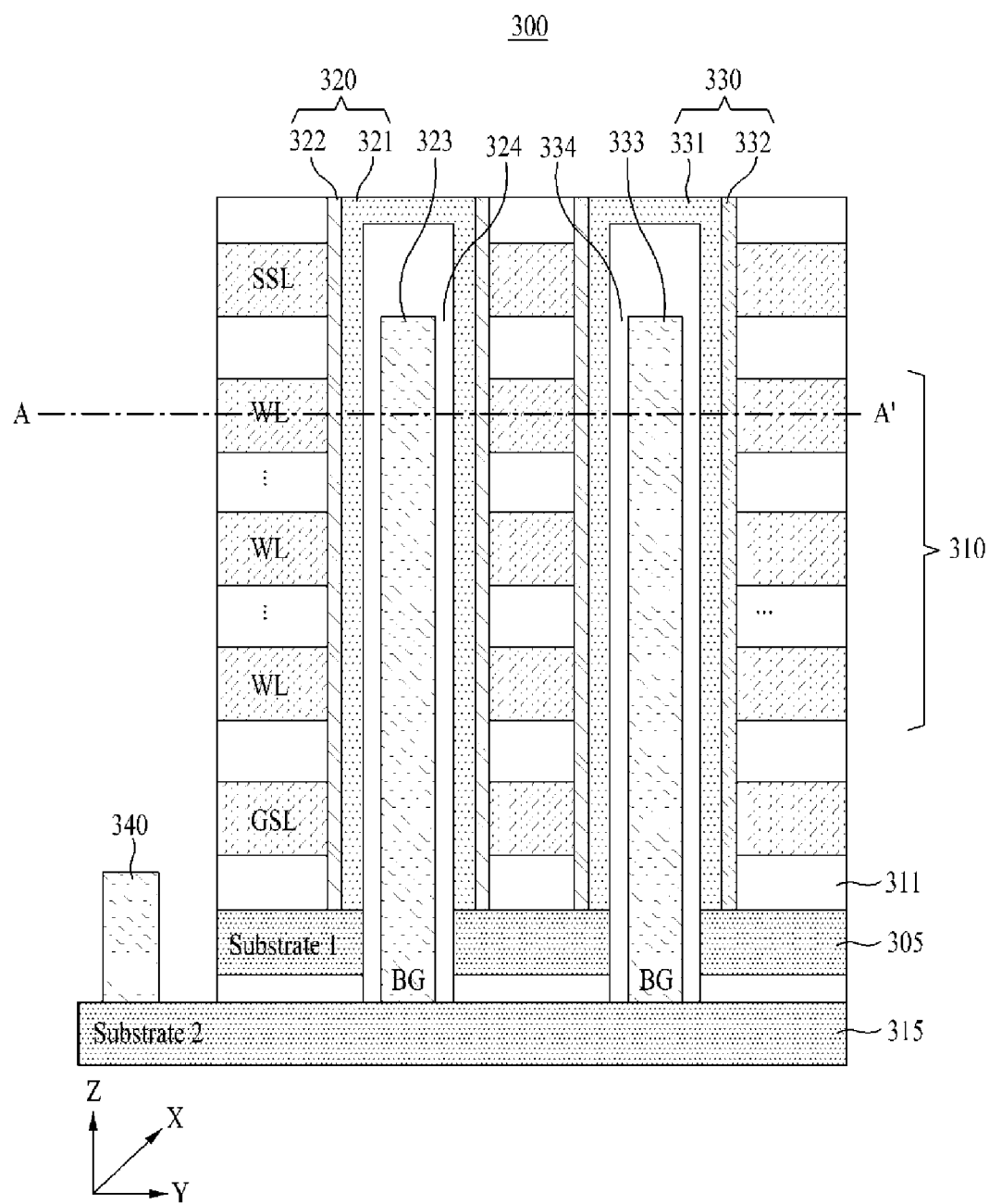
FIG. 3A is a Y-Z cross-sectional view illustrating a three-dimensional flash memory according to an embodiment.
Figure 3B:
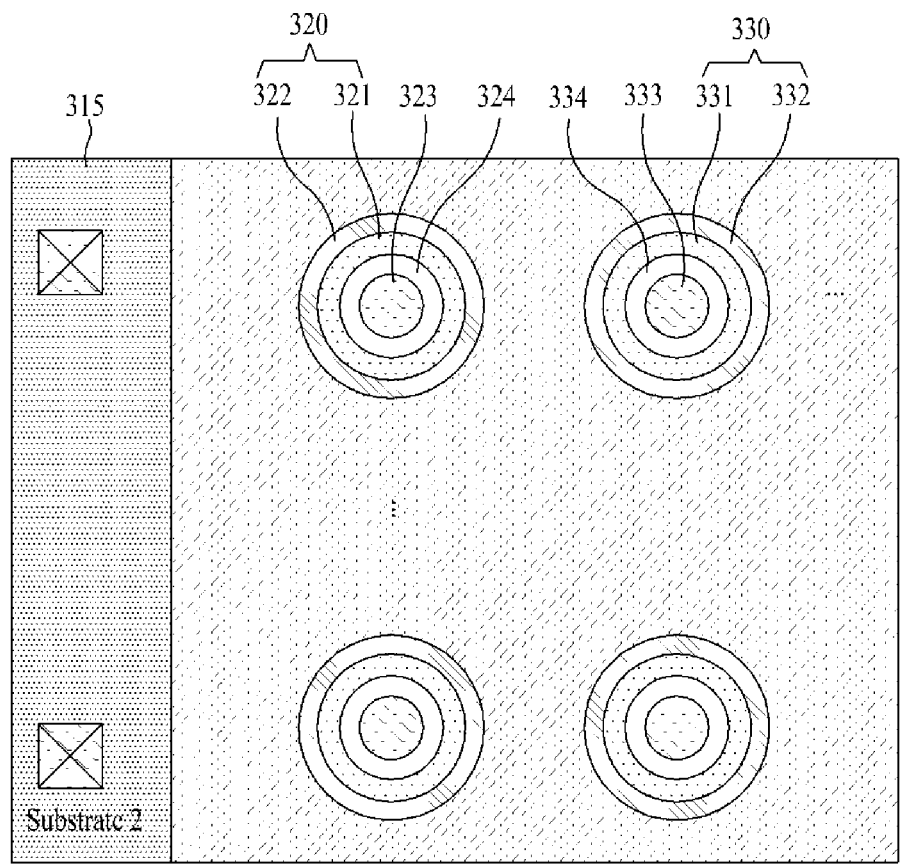
FIG. 3B is an X-Y plan view illustrating a cross section of the three-dimensional flash memory illustrated in FIG. 3A along line A-A'.
Figure 4A:
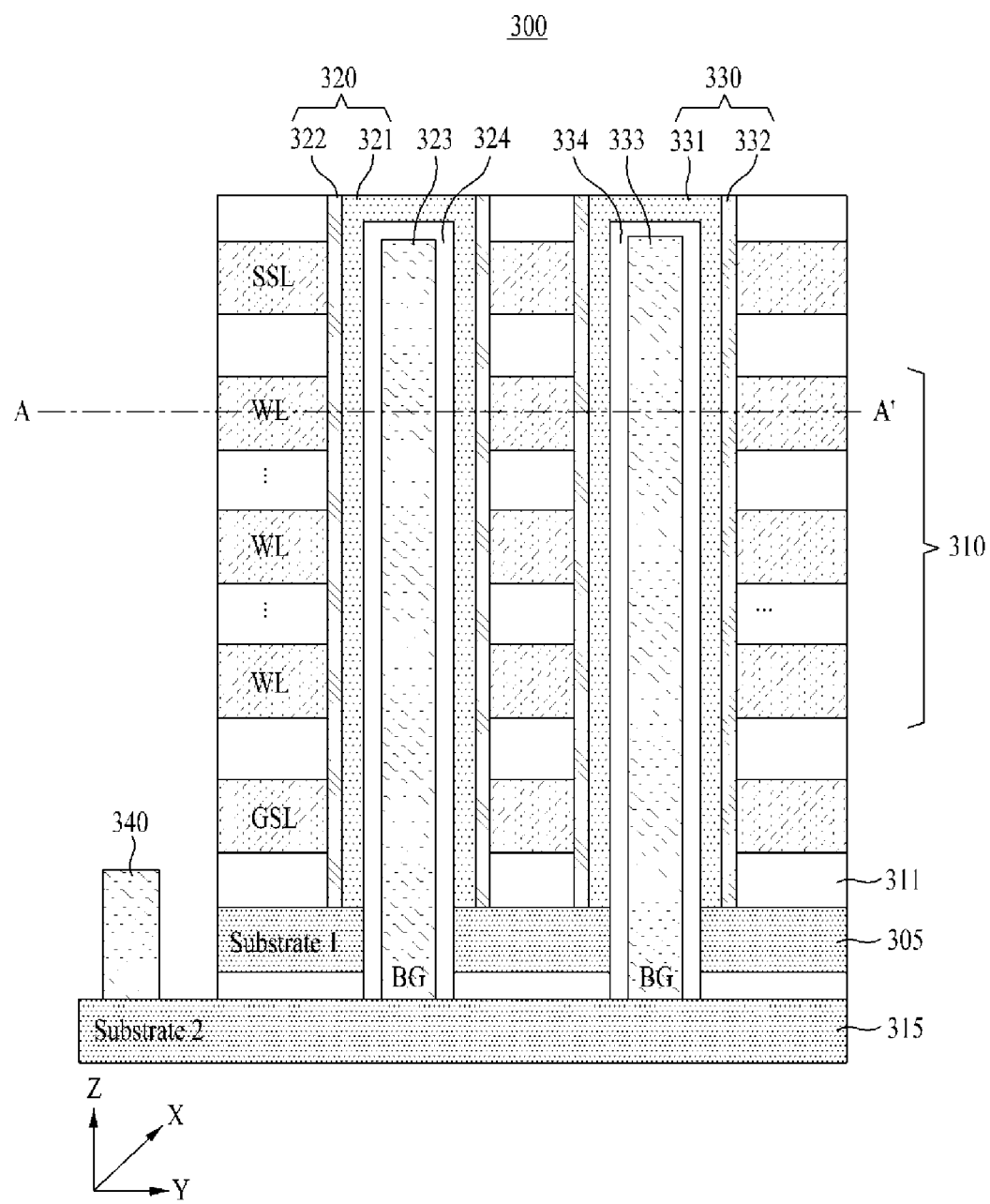
FIGS. 4A to 4D are Y-Z cross-sectional views illustrating another implementation of the three-dimensional flash memory according to an embodiment.
Figure 4B:
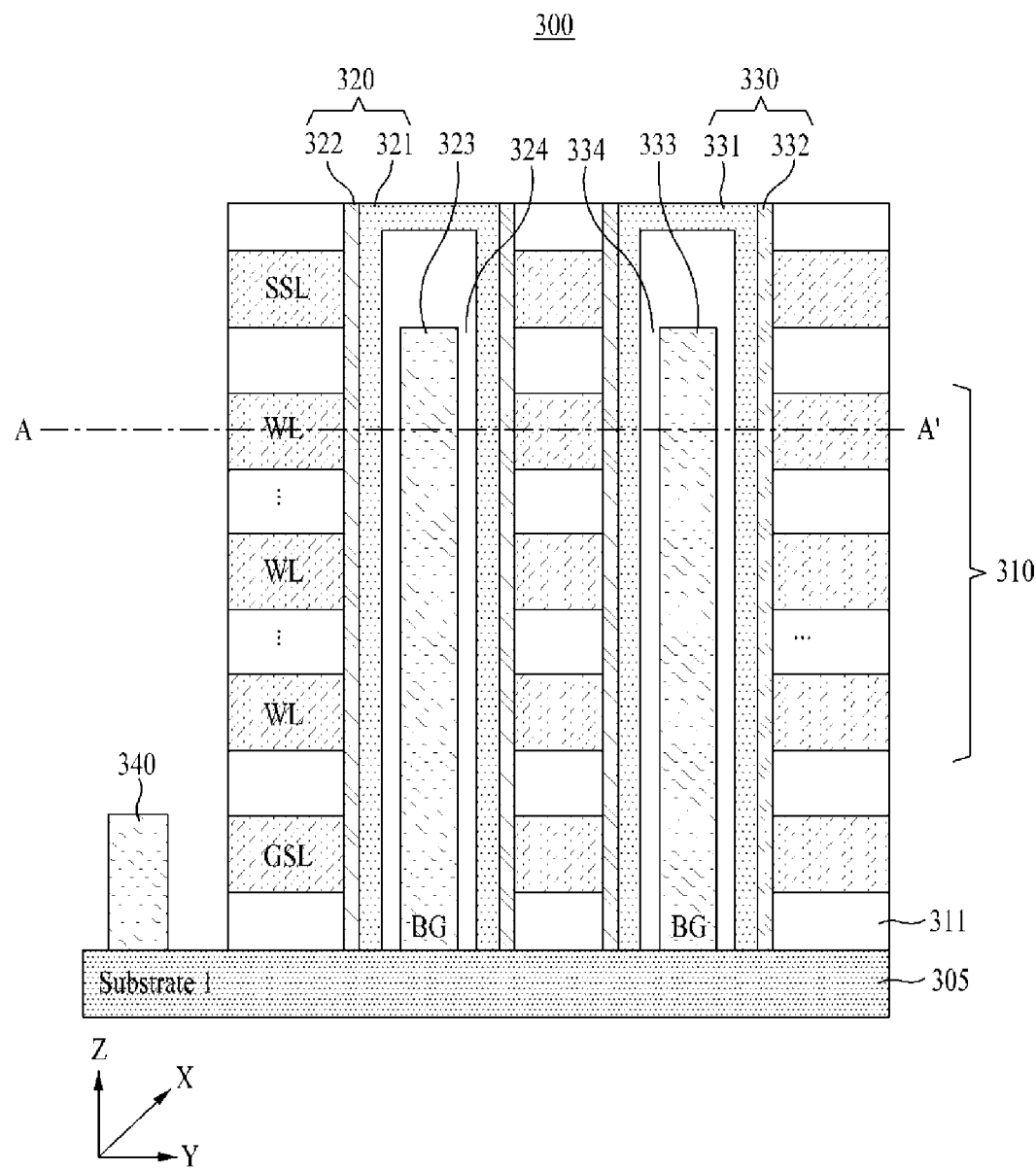
Figure 4C:
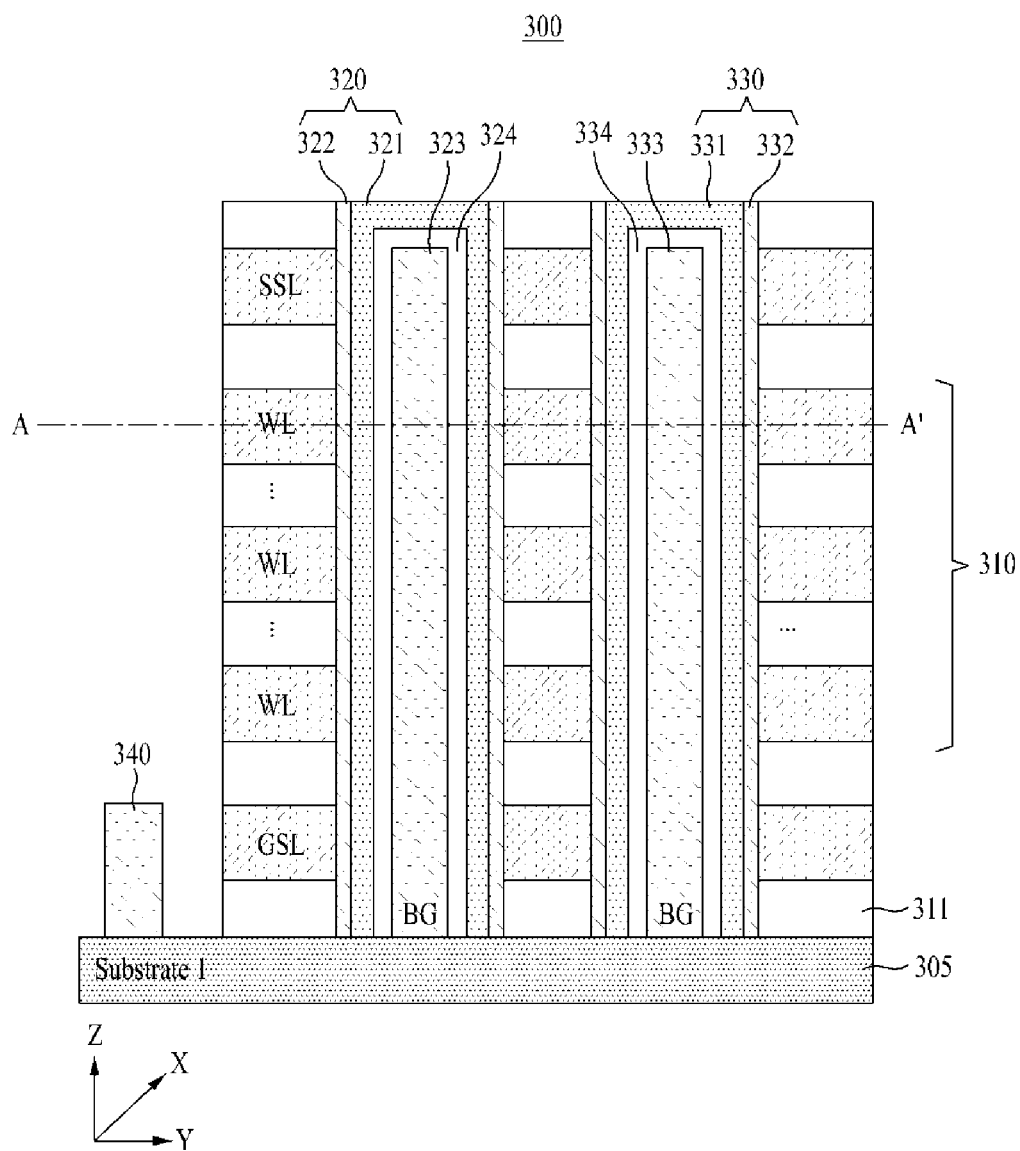
Figure 4D:
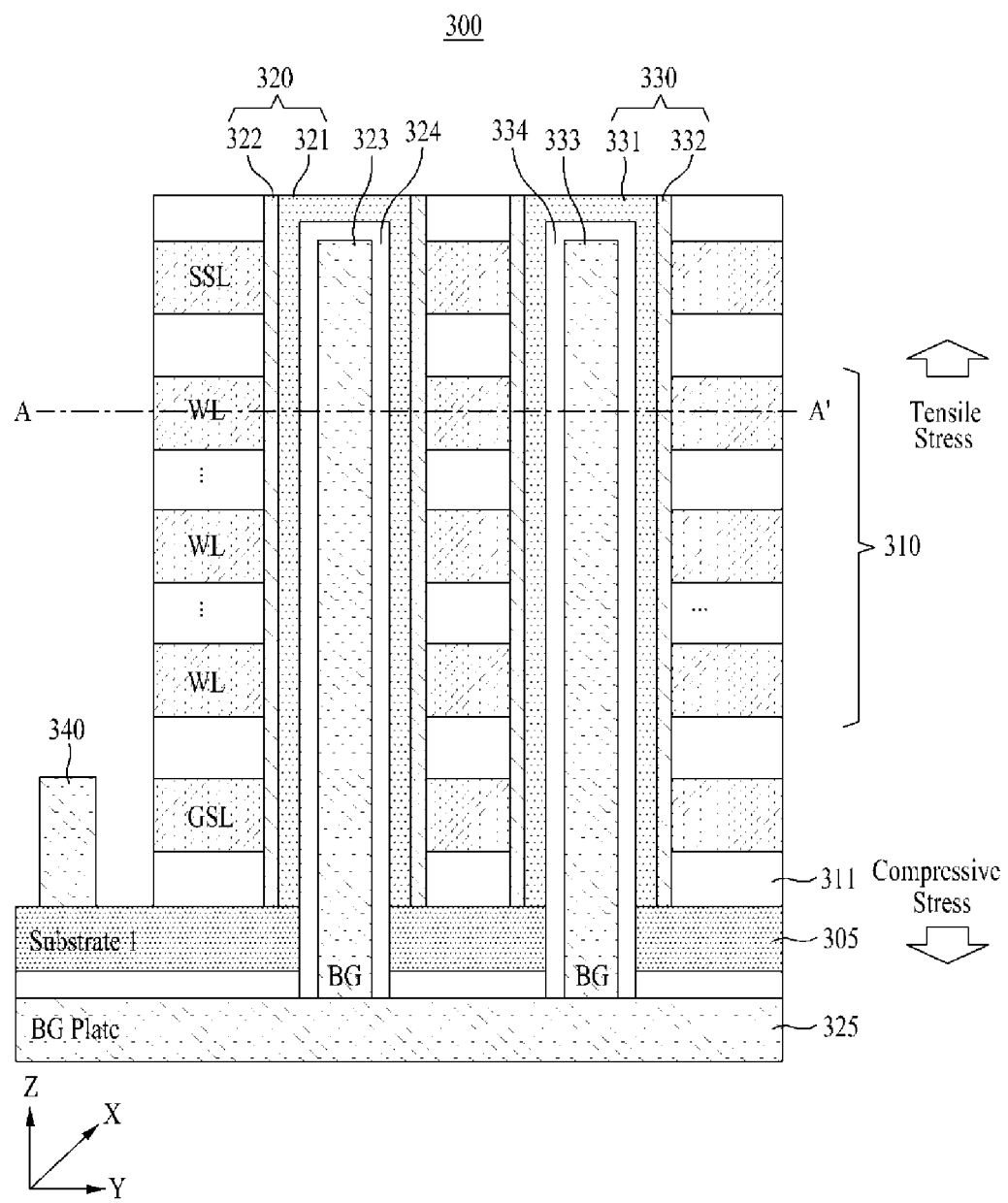
Figure 5A:
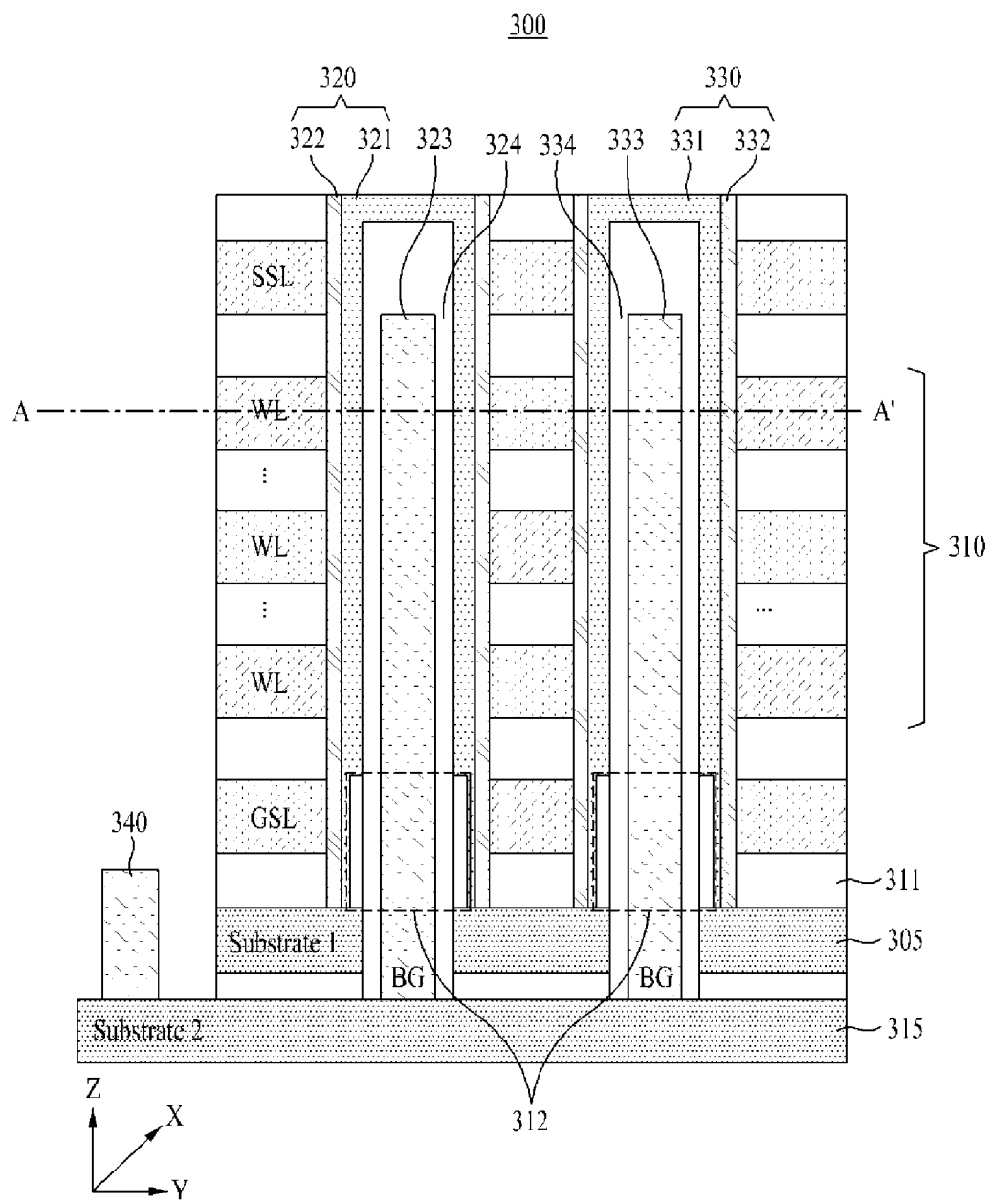
FIGS. 5A and 5B are Y-Z cross-sectional views illustrating a three-dimensional flash memory according to another embodiment.
Figure 5B:
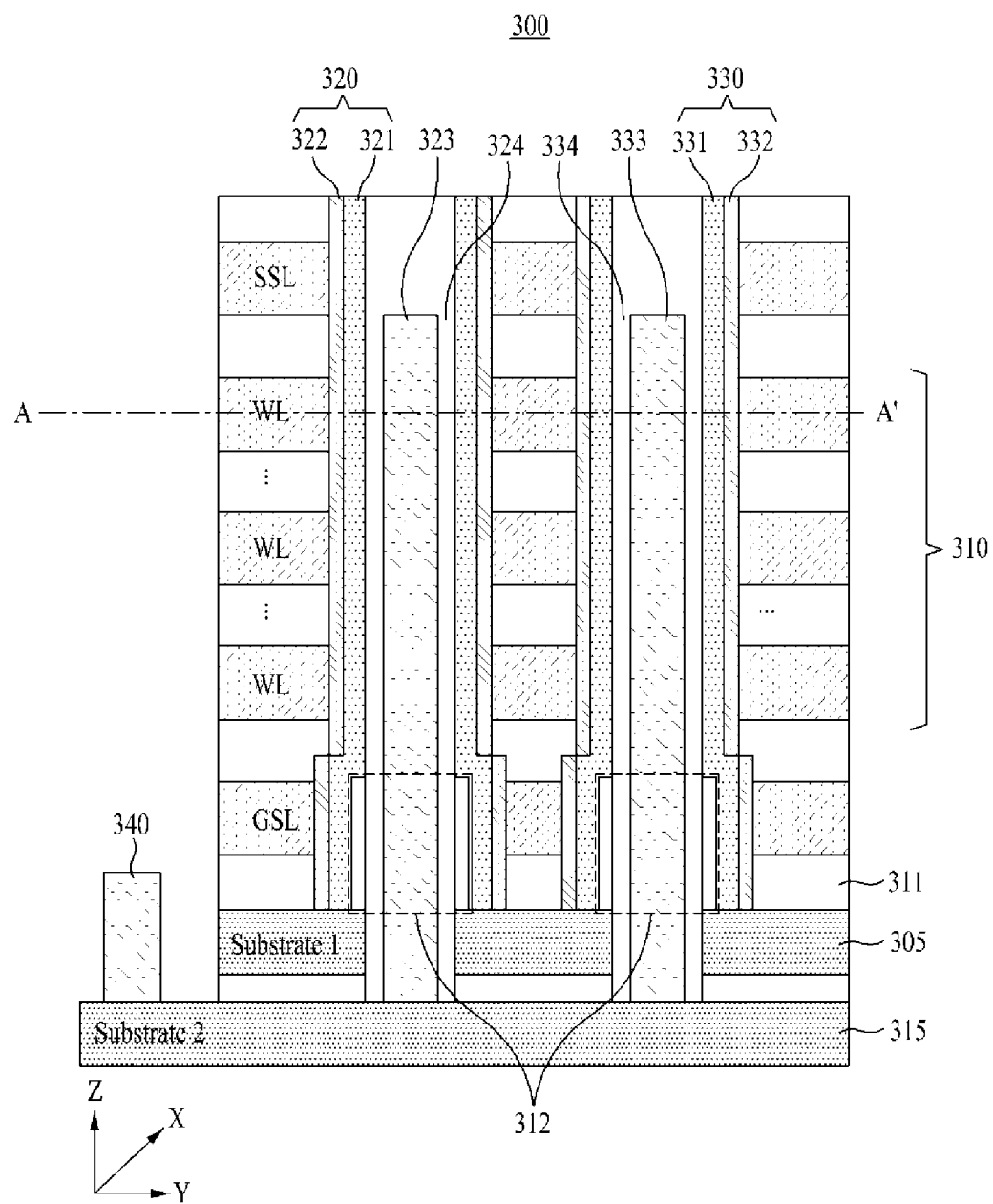

FIG. 3A is a Y-Z cross-sectional view illustrating a three-dimensional flash memory according to an embodiment, FIG. 3B is an X-Y plan view illustrating a cross section of the three-dimensional flash memory illustrated in FIG. 3A along line A-A', FIGS. 4A to 4D are Y-Z cross-sectional views illustrating another implementation of the three-dimensional flash memory according to an embodiment, and FIGS. 5A and 5B are Y-Z cross-sectional views illustrating a three-dimensional flash memory according to another embodiment.

Referring to FIGS. 3A and 3B, a three-dimensional flash memory 300 according to an embodiment includes a plurality of word lines 310 and a plurality of strings 320 and 330.

The plurality of word lines 310 are sequentially stacked while extending on a substrate 305 in a horizontal direction (for example, a Y direction), are made of conductive materials such as W (tungsten), Ti (titanium), Ta (tantalum), Cu (copper), Mo (molybdenum), Ru (ruthenium), or Au (gold) (including all metallic materials capable of forming ALD in addition to the above-described metallic materials), apply a voltage to memory cells corresponding thereto, and perform a memory operation (a reading operation, a program operation, an erasure operation, or the like). A plurality of insulating layers 311 made of an insulating material may be interposed between the plurality of word lines 310.

A string selection line SSL may be disposed above the plurality of word lines 310, and a ground source line GSL (connected to a common source line CSL (not illustrated)) may be disposed below the plurality of word lines 310.

While the plurality of strings 320 and 330 pass through the plurality of word lines 310 and extend in one direction (for example, a Z direction) on the substrate 305, and the plurality of strings 320 and 330 may include channel layers 321 and 331 and ferroelectric layers 322 and 332, respectively.

Here, the ferroelectric layers 322 and 332 are formed of a ferroelectric material of $HfO_2$ having an orthorhombic crystal structure (for example, the ferroelectric layers 322 and 332 are formed of a ferroelectric material of $HfO_2$ doped with at least one of Al, Zr, and Si or formed of a ferroelectric material including at least one of $Pb(Zr, Ti)O_3$ (PZT), $PbTiO_3$ (PTO), $SrBi_2Ti_2O_3$ (SBT), $Bi(La, Ti)O_3$ (BLT), $Pb(La, Zr)TiO_3$ (PLZT), $Bi(Sr, Ti)O_3$ (BST), $BaTiO_3$ (barium titanate), P(VDF-TrFE), PVDF, $AlO_x$, $ZnO_x$, $TiO_x$, $TaO_x$ and $InO_x$). The ferroelectric layers 322 and 332 may constitute a plurality of memory cells corresponding to the plurality of word lines 310 as areas in contact with the plurality of word lines 310, and thus may be used as data storage.

Hereinafter, the fact that the ferroelectric layers 322 and 332 are used as data storage mean that states of charges in the areas of the ferroelectric layers 322 and 332 constituting the plurality of memory cells (for example, a polarization state according to a change in a polarization charge amount) are changed and maintained due to a voltage applied through the plurality of word lines 310, and thus a binary data value is represented (or stored) as a voltage change according to the states of charges in the areas of the ferroelectric layers 322 and 332. That is, the ferroelectric layers 322 and 332 may be formed of a ferroelectric material, change and maintain the states of the charges, and thus be used as the data storage.

Further, hereinafter, the fact that the ferroelectric layers 322 and 332 constitute the plurality of cells corresponding to the plurality of word lines 310 means that the ferroelectric layers 322 and 332 constitute the plurality of memory cells using the areas in contact with the plurality of word lines 310 together with areas in contact with the channel layers 321 and 331 (areas at positions corresponding to the plurality of word lines 310). Accordingly, the plurality of memory cells may include the ferroelectric layers 322 and 332 and the channel layers 321 and 331.

In this way, the three-dimensional flash memory 300 according to an embodiment uses the ferroelectric layers 322 and 332 having thicknesses much smaller than those of the ONO layers as the data storage, thereby achieving a technical effect of improving horizontal scaling compared to the three-dimensional flash memory having a structure including the ONO layers according to the related art.

The channel layers 321 and 331 are components that transmit, to the ferroelectric layers 322 and 332, voltages applied through the bit lines connected to the plurality of word lines 310, the SSL, the GSL, and the plurality of strings 320 and 330 and perform a memory operation together with the ferroelectric layers 322 and 332 and may be formed of single crystalline silicon or polysilicon. Further, the channel layers 321 and 331 may perform the memory operation even by a voltage applied through back gates 323 and 333, which will be described below. A detailed description thereof will be made below.

The back gates 323 and 333 extending in the one direction (for example, the Z direction) and insulating films 324 and 334 extending in one direction to surround the back gates 323 and 333 are arranged inside the channel layers 321 and 331.

Here, the channel layers 321 and 331 may have a structure for preventing a leakage current in the GSL. For example, an area of the channel layers 321 and 331 corresponding to the GSL disposed below the plurality of word lines 310 may have a structure in which B (boron) is further inserted into an area of the channel layers 321 and 331 corresponding to the GSL and thus a threshold value of the corresponding area increases.

The back gates 323 and 333 may be formed of conductive materials such as W (tungsten), Ti (titanium), Ta (tantalum), Cu (copper), Mo (molybdenum), Ru (ruthenium), or Au (gold) (including all metallic materials capable of forming ALD in addition to the described metallic materials) or doped polysilicon so that a voltage may be applied to the ferroelectric layers 322 and 332 through the channel layers 321 and 331 and may extend over an inner area (an area from the GSL to the plurality of word lines 310) corresponding to the plurality of word lines 310 inside the channel layers 321 and 331. However, the present disclosure is not restricted or limited thereto, and as illustrated in FIG. 4A, the back gates 323 and 333 may extend over the corresponding inner area from the GSL to the SSL inside the channel layers 321 and 331.

Further, the back gates 323 and 333 may extend up to a substrate 315 for the back gates 323 and 333 positioned below the substrate 305 while passing through the substrate 305 from which the plurality of strings 320 and 330 extend. That is, the three-dimensional flash memory 300 including the back gates 323 and 333 may have a double substrate structure.

In the double substrate structure, the substrate 315 positioned at the bottom may be used to dissipate heat of the plurality of strings 320 and 330. As a heat dissipation path of the plurality of strings 320 and 330 is positioned on the substrate 315 distinguished from the substrate 305 from which the plurality of strings 320 and 330 extend, a problem that the heat dissipation path of the plurality of strings 320 and 330 is formed on the substrate 305 from which the plurality of strings 320 and 330 extend and thus a cell transistor is affected may be solved.

However, the present disclosure is not restricted or limited thereto, and the three-dimensional flash memory 300 including the back gates 323 and 333 may have a single substrate structure as illustrated in FIGS. 4B to 4D. In this case, the back gates 323 and 333 may extend over an inner area (an area from the GSL to the plurality of word lines 310) corresponding to the plurality of word lines 310 inside the channel layers 321 and 331 on the substrate 305 from which the plurality of strings 320 and 330 extend as illustrated in FIG. 4B or may extend over an inner area from the GSL to the SSL inside the channel layers 321 and 331 on the substrate 305 from which the plurality of strings 320 and 330 extend as illustrated in FIG. 4C.

Further, the three-dimensional flash memory 300 including the back gates 323 and 333 may further include a back gate plate 325 horizontally disposed below the substrate 305 while passing through the substrate 305 in a single substrate structure including only the substrate 305 in which the plurality of word lines 310 are stacked and from which the plurality of strings 320 and 330 extend in one direction as illustrated in FIG. 4D. The back gate plate 325 may serve to prevent a warpage of the substrate 305 by alleviating a film stress of the plurality of word lines 310 while being formed of the same material as the back gates 323 and 333. In this structure, the back gates 323 and 333 may extend up to the back gate plate 325.

In both the single substrate structure and the double substrate structure, a wire 340 for a voltage applied to the back gates 323 and 333 may be formed on upper surfaces of the substrates 305 and 315 connected to the back gates 323 and 333 as illustrated in FIGS. 4A, 4B, and 4D. However, the present disclosure is not restricted or limited to the drawings, and the wire 340 for a voltage applied to the back gates 323 and 333 may be formed on lower surfaces of the substrates 305 and 315 connected to the back gates 323 and 333 (not illustrated).

The back gates 323 and 333 having such a structure may be used to apply a voltage for changing and maintaining states of charges of the ferroelectric layers 322 and 332 in the memory operation (for example, the program operation, the erasure operation, and the reading operation) of the three-dimensional flash memory 300 (for example, the back gates 323 and 333 may be used to change and maintain the states of the charges of the ferroelectric layers 322 and 332 through applying a voltage to the ferroelectric layers 322 and 332 through the channel layers 321 and 331). Accordingly, the voltage applied to the back gates 323 and 333, together with a voltage applied to the plurality of word lines 310 and a voltage applied to a plurality of bit lines (not illustrated) connected to the plurality of strings 320 and 330, causes the memory operation of the three-dimensional flash memory 300. Therefore, the three-dimensional flash memory 300 according to an embodiment may improve a memory operating current by further using the back gates 323 and 333 in addition to the plurality of word lines 310 and the plurality of bit lines during the memory operation, so that a memory operation speed may increase, and thus cell characteristics and reliability may be improved.

For example, during the program operation of the three-dimensional flash memory 300, a pass voltage allowing only a target memory cell to be subjected to the program operation may be applied to the back gates 323 and 333 included in the plurality of strings 320 and 330 on the basis of a program voltage having a negative value and applied to a word line corresponding to the target memory cell that is subjected to the program operation among the plurality of word lines 310 and voltages applied to the plurality of bit lines connected to the plurality of strings 320 and 330. A detailed description thereof will be made below with reference to FIGS. 6 to 7.

For another example, during the erasure operation of the three-dimensional flash memory 300, at least one back gate 323 included in at least one selected string 320 that is subjected to the erasure operation among the plurality of strings 320 and 330 may float to erase memory cells included in the at least one selected string 320 on the basis of an erasure voltage applied to the plurality of word lines 310 and a voltage applied to at least one bit line connected to the at least one selected string 320. On the other hand, during the erasure operation of the three-dimensional flash memory 300, a pass voltage preventing memory cells included in at least one non-selected string 330 from being erased may be applied to at least one back gate 333 included in the at least one non-selected string 330 except for the at least one selected string 320 that is subjected to the erasure operation among the plurality of strings 320 and 330 on the basis of the erasure voltage applied to the plurality of word lines 310 and a voltage applied to at least one bit line connected to the at least one non-selected string 330. A detailed description thereof will be made below with reference to FIGS. 8 to 9.

For still another example, during the reading operation of the three-dimensional flash memory 300, a negative voltage at which only a target memory cell is read may be applied to the back gate 323 included in the selected string 320 including the target memory cell that is subjected to the reading operation among the plurality of strings 320 on the basis of a reading voltage applied to the word line corresponding to the target memory cell among the plurality of word lines 310, a pass voltage applied to the at least one word line corresponding to at least one other memory cell except for the target memory cell among the plurality of word lines 310, and a voltage applied to the bit line connected to the selected string 320. However, the present disclosure is not restricted or limited thereto, and during the reading operation of the three-dimensional flash memory 300, the back gate 323 included in the selected string 320 including the target memory cell that is subjected to the reading operation among the plurality of strings 320 may float so that only the target memory cell is read on the basis of the reading voltage applied to the word line corresponding to the target memory cell among the plurality of word lines 310, the pass voltage applied to the at least one word line corresponding to at least one other memory cell except for the target memory cell among the plurality of word lines 310, and the voltage applied to the bit line connected to the selected string 320. In this case, during the reading operation, a pass voltage that prevents memory cells included in the at least one non-selected string 330 from being read may be applied to the at least one back gate 333 included in the at least one non-selected string 330 except for the selected string 320 among the plurality of strings 320 and 330 on the basis of the reading voltage applied to the word line corresponding to the target memory cell among the plurality of word lines 310, the pass voltage applied to the at least one word line corresponding to at least one other memory cell except for the target memory cell among the plurality of word lines 310, and a voltage applied to at least one bit line connected to at least one non-selected string 330. A detailed description thereof will be made below with reference to FIGS. 10 to 11.

Further, the back gates 323 and 333 are utilized while a threshold voltage is initially adjusted in units of blocks in which the plurality of strings 320 and 330 are grouped, so that the reading operation, the program operation, and the erasure operation may be performed without being affected by a structural deviation of a block unit string. For example, the three-dimensional flash memory 300 may compensate for initial threshold voltages of the memory cells according to each block by applying a fine control voltage through the back gates 323 and 333 in consideration of the structural deviation of the block unit string, and thus may adjust all the initial threshold voltages similarly or identically. In more detail, a voltage of −0.2 V is applied to a back gate of a string included in a block "A", a voltage of −0.1 V is applied to a back gate of a string included in a block "B", and thus an initial threshold value of the memory cells of the string included in the block "A" and an initial threshold value of the memory cells of the string included in the block "B" may be set to be the same.

Hereinabove, it has been described that the back gates 323 and 333 have a structure in which the back gates 323 and 333 are electrically separated from each other in units of blocks so that different voltages are applied to the strings 320 and 330 in grouped units of blocks, but the present disclosure is not restricted or limited thereto, and the back gates 323 and 333 may have a structure in which the back gates 323 and 333 are electrically separated from each other according to each string so that different voltages may be applied in units of strings.

The insulating films 324 and 334 may be formed of an insulating material to prevent the back gates 323 and 333 from being in direct contact with the channel layers 321 and 331, and in particular, may have a structure for preventing a leakage current in the GSL. For example, an area 312 corresponding to the GSL disposed at a lower end of the plurality of word lines 310 among the insulating films 324 and 334 may have a thickness greater than that of the other area to prevent the leakage current in the GSL as illustrated in FIGS. 5A and 5B.

Further, the insulating films 324 and 334 may have the same EOT as the ferroelectric layers 322 and 332 so that the back gates 323 and 333 are used as gates together with the plurality of word lines 310. A detailed description thereof will be made below with reference to FIGS. 12 to 13.

Hereinafter, the described memory operation is assumed to be performed by the three-dimensional flash memory having the structure described with reference to FIGS. 3A and 3B, and may be equally performed in the three-dimensional flash memory having the structure described with reference to FIGS. 4A to 4D and 5A and 5B.

Figure 6:
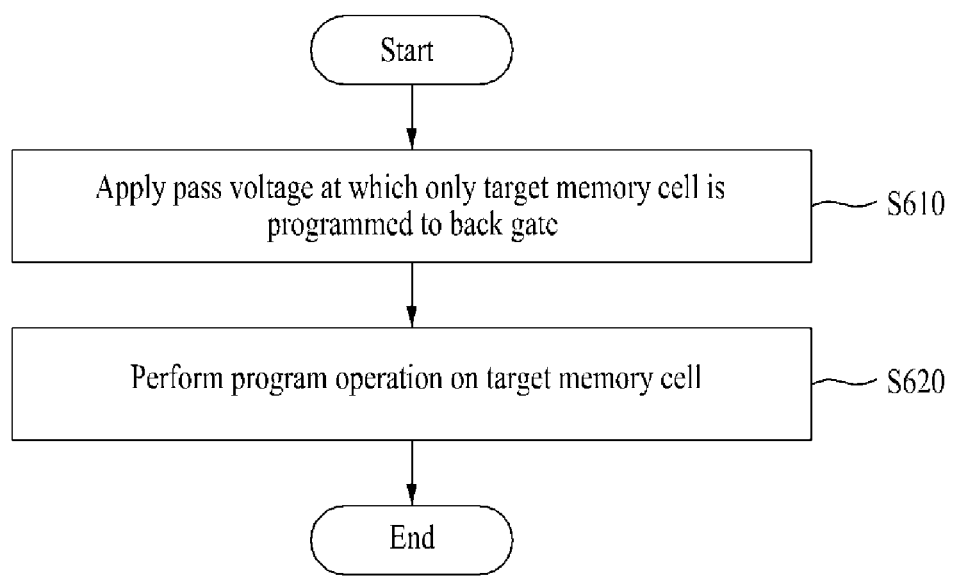
FIG. 6 is a flowchart illustrating a program operation of the three-dimensional flash memory according to an embodiment.
Figure 7:
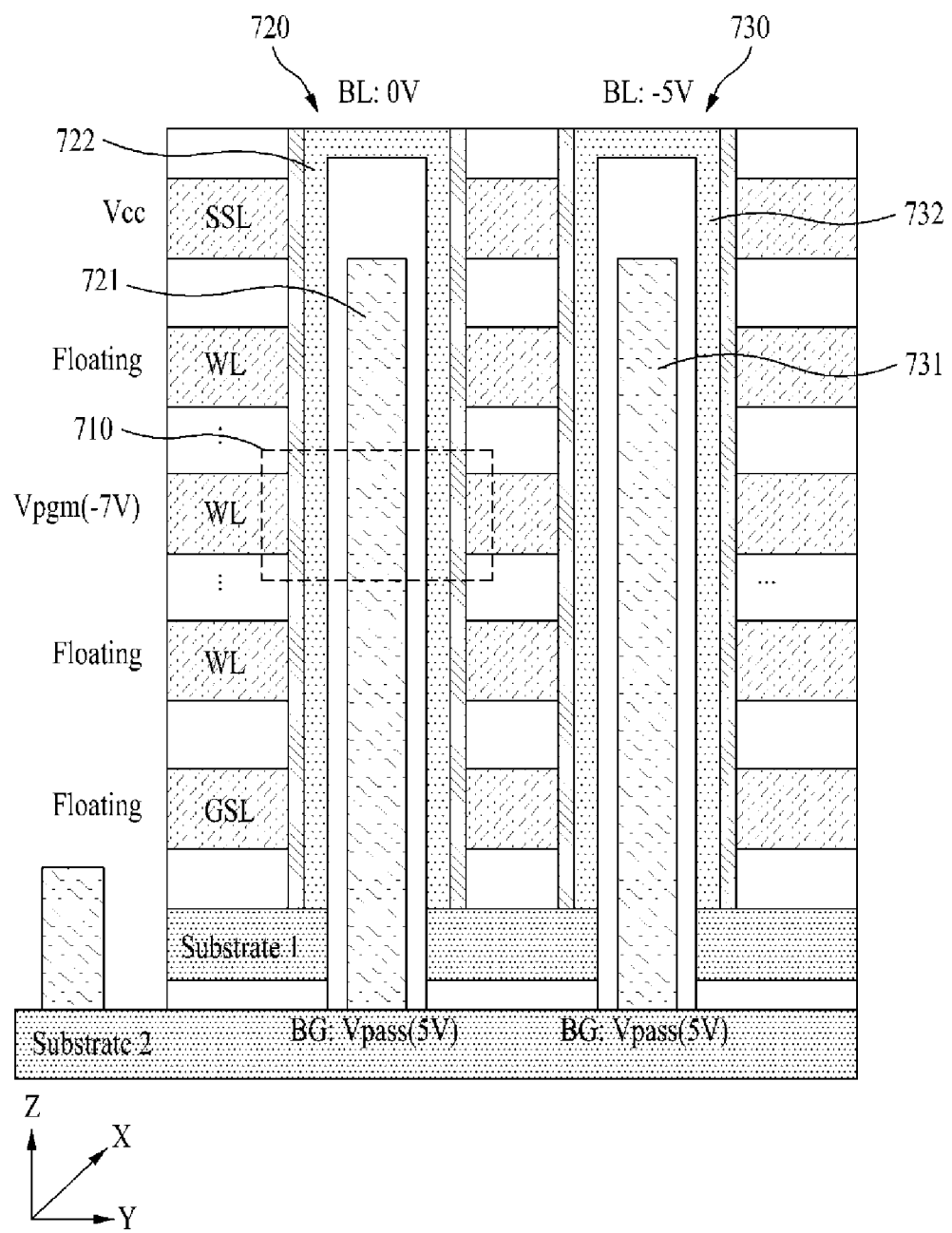
FIG. 7 is a Y-Z cross-sectional view for describing the program operation of the three-dimensional flash memory according to an embodiment.

FIG. 6 is a flowchart illustrating a program operation of the three-dimensional flash memory according to an embodiment, and FIG. 7 is a Y-Z cross-sectional view for describing the program operation of the three-dimensional flash memory according to an embodiment.

Referring to FIGS. 6 to 7, in operation S610, the three-dimensional flash memory may apply a pass voltage Vpass (for example, 5 V) at which only a memory cell 710 is programmed in back gates 721 and 731 included in a plurality of strings 720 and 730 on the basis of a negative program voltage Vpgm applied to a word line corresponding to the target memory cell 710 that is subjected to the program operation among the plurality of word lines and voltages (0 V that is a ground voltage or a negative voltage) applied to a plurality of bit lines connected to the plurality of strings 720 and 730.

In this case, in operation S610, the three-dimensional flash memory may allow at least one word line corresponding to at least one other memory cell except for the target memory cell 710 to also float on the basis of the pass voltage applied to the back gates 721 and 731 while a power supply voltage Vcc (for example, 3.3 V) is applied to the SSL and the GSL and the CSL float.

In more detail, in the three-dimensional flash memory, in the selected string 720 including the target memory cell 710 during the program operation, in operation S610, the power supply voltage Vcc may be applied to the SSL, the negative program voltage (for example, −7 V) may be applied to the word line corresponding to the target memory cell 710, all of at least one word line corresponding to at least one other memory cell except for the GSL, the CSL, and the target memory cell 710 may float, and a ground voltage of 0 V may be applied to a bit line connected to the selected string 720. In response to this, in the three-dimensional flash memory, the pass voltage Vpass may be applied to the back gate 721 included in the selected string 720.

On the other hand, in at least one non-selected string 730 not including the target memory cell 710 during the program operation, in the three-dimensional flash memory, in operation S610, the power supply voltage Vcc may be applied to the SSL, the negative program voltage (for example, −7 V) may be applied to the word line corresponding to the target memory cell 710, all of at least one word line corresponding to at least one other memory cell except for the GSL, the CSL, and the target memory cell 710 may float, and a negative voltage (a voltage, for example, −5V, having a sign that is opposite to the pass voltage applied to the back gate 731 and an absolute value that is the same as the pass voltage) may be applied to the bit line connected to the at least one non-selected string 730. In response to this, in the three-dimensional flash memory, the pass voltage Vpass (for example, 5 V) may be applied to the back gate 731 included in the least one non-selected string 730.

Thus, in operation S620, in the three-dimensional flash memory, in response that the voltages are applied as in operation S610 (in response that the ground voltage is applied to the bit line connected to the selected string 720, the pass voltage is applied to the back gate 721, and thus a channel is formed on a channel layer 722 of the selected string 720), the program operation on the target memory cell 710 in the selected string 720 may be performed. In this case, since no channel is formed in a channel layer 732 of the at least one non-selected string 730 due to the negative voltage applied to the bit line connected to the at least one non-selected string 730 and the pass voltage applied to the back gate 732, no program operation is performed on the at least one non-selected string 730.

In this way, as the program operation according to an embodiment is based on as a method in which the pass voltage is applied to the back gate rather than the word line, the pass voltage is not applied to the word line corresponding to the at least one other memory cell except for the target memory cell 710, and thus a disturbance phenomenon caused by the application of the pass voltage to the word line may be prevented. Further, as the disturbance phenomenon is prevented, program operation characteristics may be improved so that the cell characteristics and reliability may be improved, and a speed at which the channel is formed on the channel layer 722 of the selected string 720 may be increased.

Figure 8:
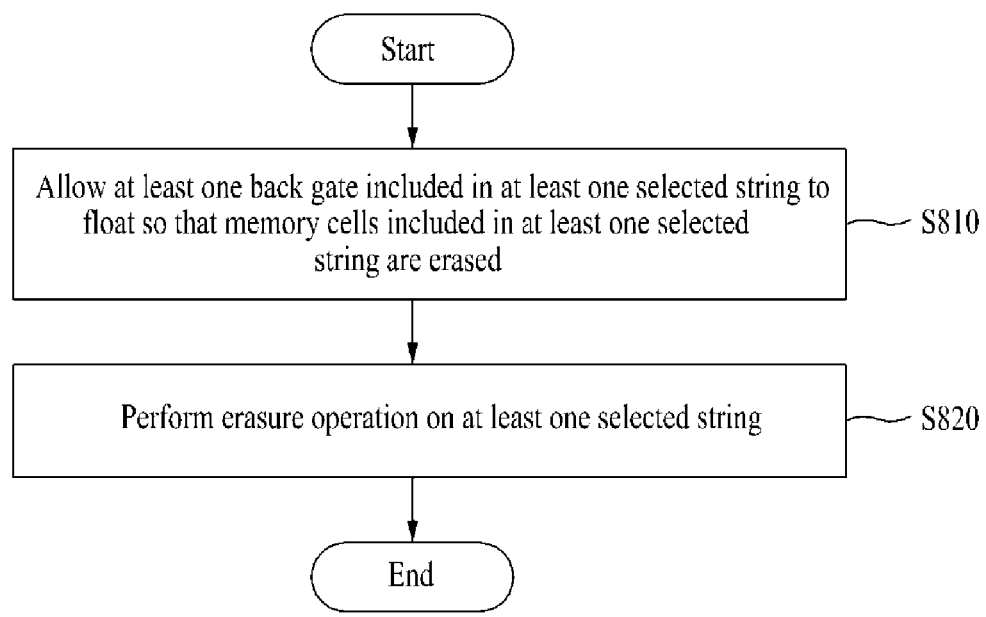
FIG. 8 is a flowchart illustrating an erasure operation of the three-dimensional flash memory according to an embodiment.
Figure 9:
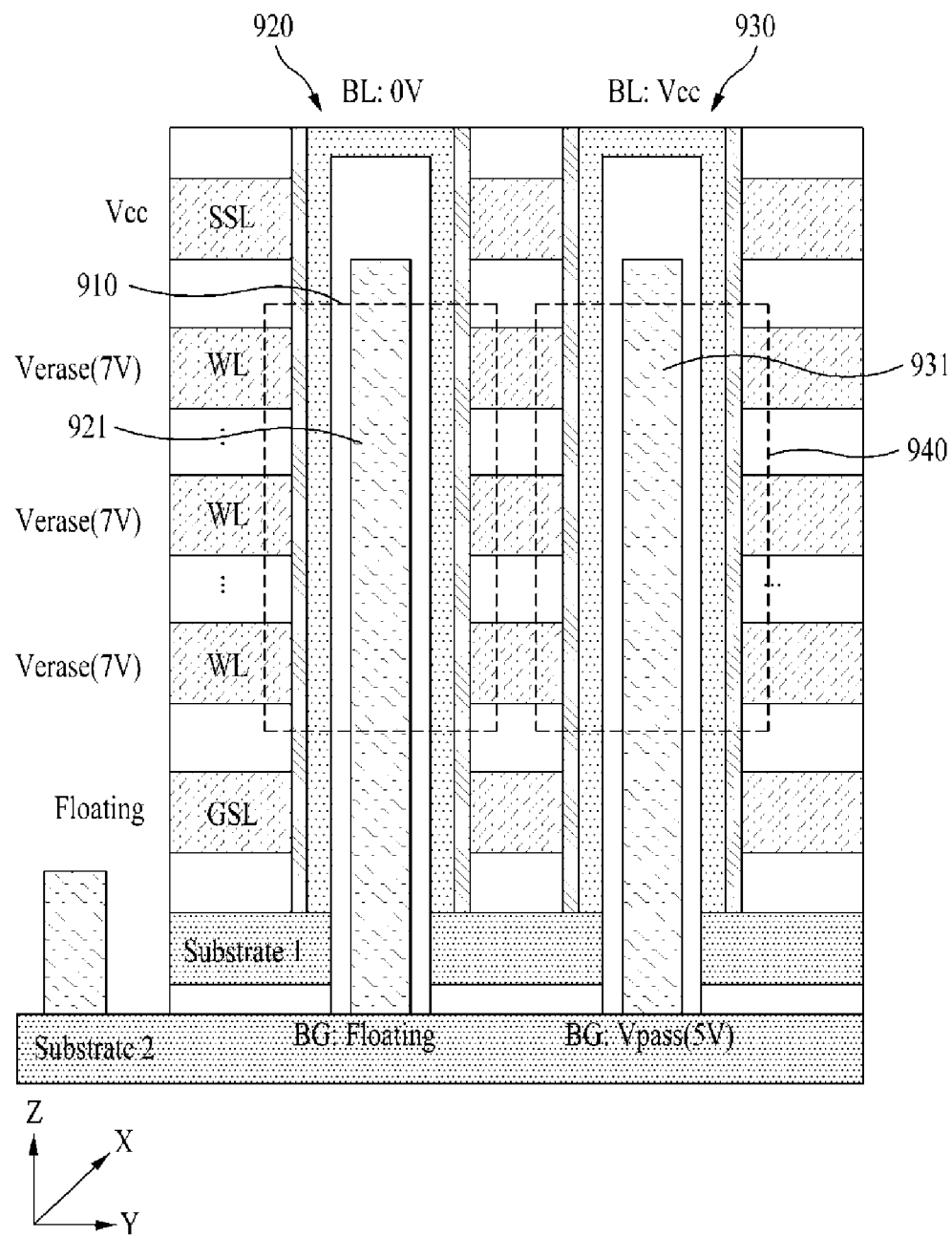
FIG. 9 is a Y-Z cross-sectional view for describing the erasure operation of the three-dimensional flash memory according to an embodiment.

FIG. 8 is a flowchart illustrating an erasure operation of the three-dimensional flash memory according to an embodiment, and FIG. 9 is a Y-Z cross-sectional view for describing the erasure operation of the three-dimensional flash memory according to an embodiment.

Referring to FIGS. 8 to 9, in operation S810, in the three-dimensional flash memory, in the erasure operation on at least one selected string 920 that is subjected to the erasure operation among a plurality of strings 920 and 930, at least one back gate 921 included in the at least one selected string 920 may float so that memory cells 910 included in the at least one selected string 920 are erased on the basis of an erasure voltage Verase (7 V) applied to each of the plurality of word lines and a voltage (a ground voltage, for example, 0 V) applied to at least one bit line connected to the at least one selected string 920.

In more detail, in the three-dimensional flash memory, for the at least one selected string 920 including the memory cells 910 to be erased during the erasure operation, in operation S810, the power supply voltage Vcc may be applied to the SSL, the erasure voltage Verase (7 V) may be applied to each of the plurality of word lines, the GSL and the CSL may float, and the ground voltage (0 V) may be applied to the at least one bit line connected to the at least one selected string 920. In response to this, in the three-dimensional flash memory, the at least one back gate 921 included in the at least one selected string 920 may float.

In this case, in operation S810, in the three-dimensional flash memory, for at least one non-selected string 930 except for the at least one selected string 920 among the plurality of strings 920 and 930, the pass voltage Vpass (for example, 5 V) may be applied to at least one back gate 931 included in the at least one non-selected string 930 so as not to erase memory cells 940 included in the at least one non-selected string 930 on the basis of the erasure voltage Verase (7 V) applied to each of the plurality of word lines and a voltage (for example, the power supply voltage Vcc) applied to at least one bit line 931 connected to the at least one non-selected string 930.

In more detail, in the three-dimensional flash memory, in operation S810, the power supply voltage Vcc may be applied to the SSL, the erasure voltage Verase (7 V) may be applied to each of the plurality of word lines, the GSL and the CSL may float, and the power supply voltage Vcc may be applied to the at least one bit line connected to the at least one non-selected string 930. In response to this, in the three-dimensional flash memory, the pass voltage Vpass (for example, 5 V) may be applied to the at least one back gate 931 included in the least one non-selected string 930.

Thus, in operation S820, in the three-dimensional flash memory, in response that the voltages are applied as in operation S810 (in response that the ground voltage is applied to the bit line connected to the at least one selected string 920 and the at least one back gate 921 floats), the erasure operation may be performed on the plurality of memory cells 910 included in the at least one selected string 920. In this case, the plurality of memory cells 940 included in the at least one non-selected string 930 may not be erased in response that the power supply voltage is applied to the at least one bit line connected to the at least one non-selected string 930 and the pass voltage is applied to the at least one back gate 931.

In this way, the erasure operation according to an embodiment is based on a method of additionally using the back gates 921 and 931 as well as the plurality of word lines 910, thereby increasing an erasure operation speed and improving the cell characteristics and reliability.

Figure 10:
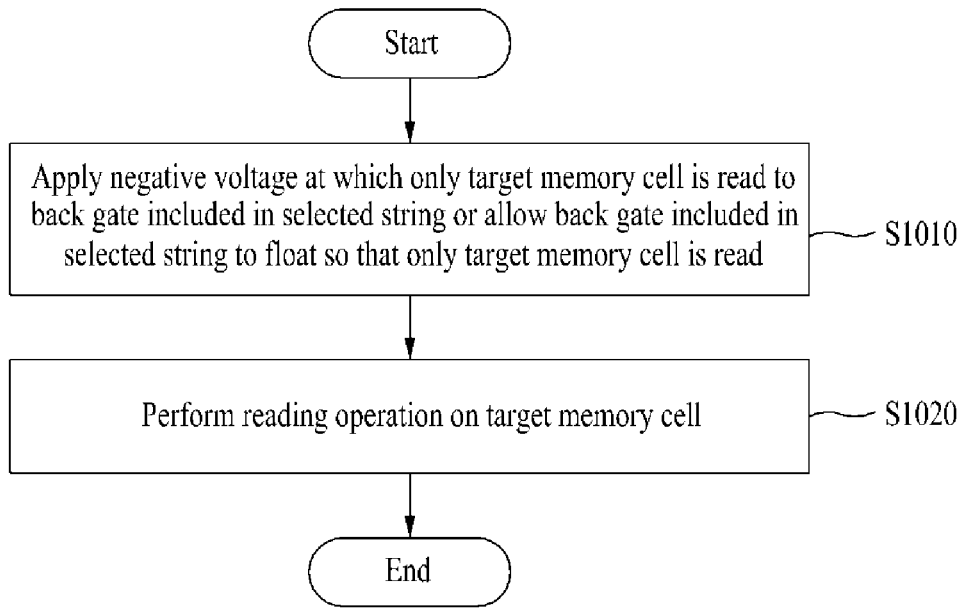
FIG. 10 is a flowchart illustrating a reading operation of the three-dimensional flash memory according to an embodiment.
Figure 11:
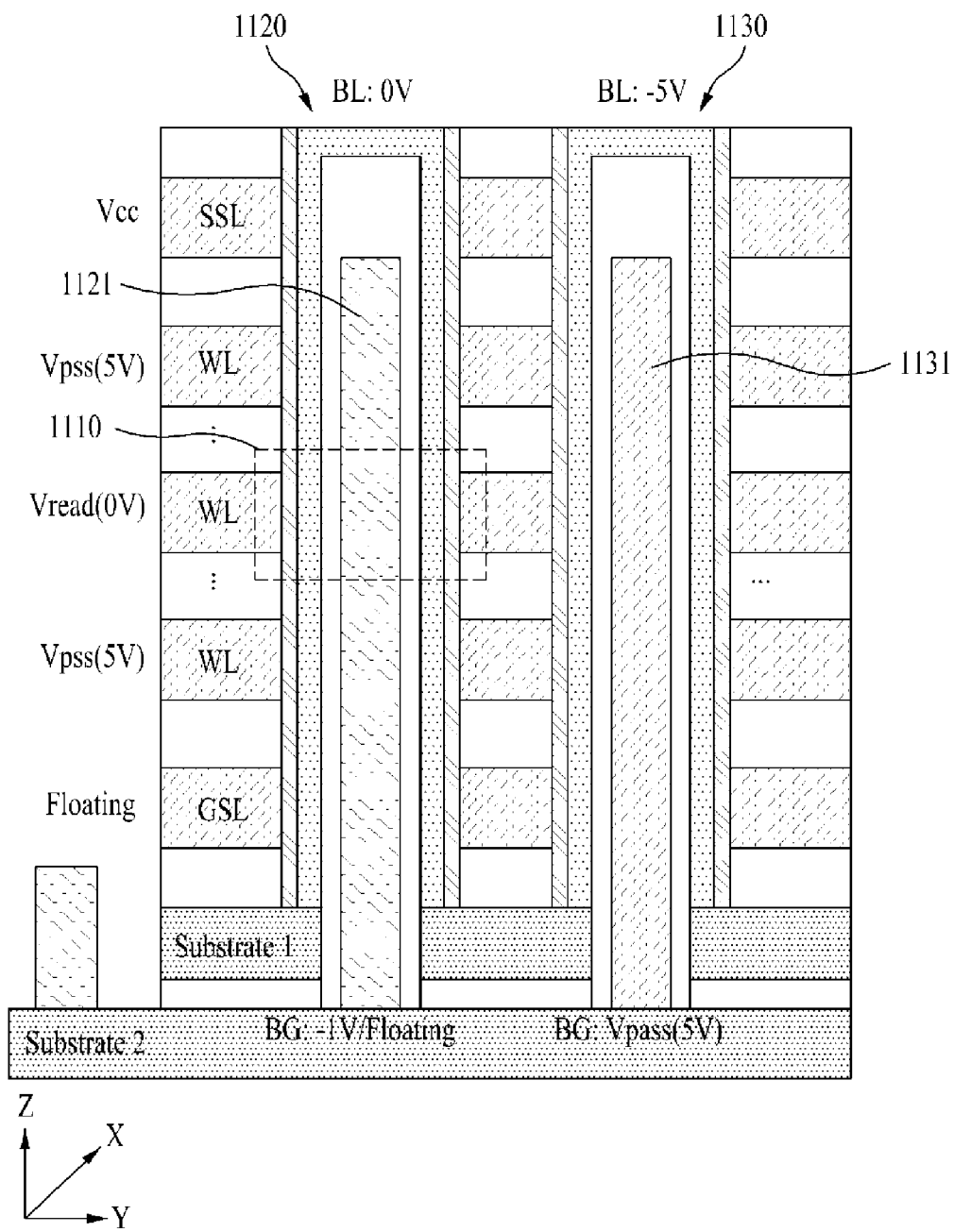
FIG. 11 is a Y-Z cross-sectional view for describing the reading operation of the three-dimensional flash memory according to an embodiment.

FIG. 10 is a flowchart illustrating a reading operation of the three-dimensional flash memory according to an embodiment, and FIG. 11 is a Y-Z cross-sectional view for describing the reading operation of the three-dimensional flash memory according to an embodiment.

Referring to FIGS. 10 and 11, in operation S1010, in the three-dimensional flash memory, in the reading operation on a selected string 1120 including a target memory cell 1110 that is subjected to the reading operation among a plurality of strings 1120 and 1130, a negative voltage (for example, −1 V) is applied to a back gate 1121 included in the selected string 1120 so that only the target memory cell 1110 is read or the back gate 1121 included in the selected string 1120 may float so that only the target memory cell 1110 is read on the basis of a Vread (for example, 0 V) applied to a word line corresponding to the target memory cell 1110 among a plurality of word lines, a pass voltage Vpass (for example, 5 V) applied to at least one word line corresponding at least one other memory cell except for the target memory cell 1110 among the plurality of word lines, and a voltage (for example, 1 V) applied to a bit line connected to the selected string 1120.

In more detail, in the three-dimensional flash memory, during the reading operation, for the selected string 1120 including the target memory cell 1110, in operation S1010, the power supply voltage Vcc may be applied to the SSL, the reading voltage Vread (for example, 0 V) may be applied to the word line corresponding to the target memory cell 1110, the pass voltage Vpass (for example, 5 V) may be applied to at least one word line corresponding to at least other memory cell, the GSL and the CSL may float, and a voltage of 1 V may be applied to the bit line connected to the selected string 1120. In response to this, in the three-dimensional flash memory, the back gate 1121 included in the selected string 1120 may float or a voltage of −1 V that is a negative value may be applied.

In this case, in operation S1010, in the three-dimensional flash memory, for at least one unselected string 1130 except for the selected string 1120 among the plurality of strings 1120 and 1130, the pass voltage Vpass (for example, 5 V) that prevents memory cells included in at least one non-selected string 1130 from being read may be applied to the at least one back gate 1131 included in the at least one non-selected string 1130 on the basis of the reading voltage Vread (for example, 0 V) applied to the word line corresponding to the target memory cell 1110 among the plurality of word lines, the pass voltage Vpass (for example, 5 V) applied to at least one word line corresponding to at least one other memory cell except for the target memory cell 1110 among the plurality of word lines, and a voltage applied to at least one bit line connected to the at least one non-selected string 1130 (a negative voltage having a sign opposite to the pass voltage applied to the at least one word line corresponding to the at least one other memory cell and having the same absolute value as the pass voltage, for example, −5 V).

In more detail, in the three-dimensional flash memory, in operation S1010, the power supply voltage Vcc may be applied to the SSL, the reading voltage Vread (for example, 0 V) may be applied to the word line corresponding to the target memory cell 1110, the pass voltage Vpass (for example, 5 V) may be applied to the at least one word line corresponding to the at least one other memory cell, the GSL and the CSL may float, and a negative pass voltage may be applied to the at least one bit line connected to the at least one non-selected string 1130. In response to this, in the three-dimensional flash memory, the pass voltage may be applied to the at least one back gate 1131 included in the least one non-selected string 1130.

Thus, in operation S1020, in the three-dimensional flash memory, in response that the voltages are applied as in operation S1010 (in response that a voltage of 1 V is applied to the bit line connected to the selected string 1120, and at the same time, the back gate 1121 floats or a negative voltage is applied), the reading operation on the target memory cell 1110 included in the selected string 1120 may be performed. In this case, the plurality of memory cells included in the at least one non-selected string 1130 may not be read in response that a negative pass voltage is applied to the at least one bit line connected to the at least one non-selected string 1130 and the pass voltage is applied to the at least one back gate 1131.

In this way, the reading operation according to an embodiment is based on a method of further using the back gates 1121 and 1131 as well as the plurality of word lines, so that a reading operation speed and a reading operation current can be improved, and thus the cell characteristics and reliability can be improved.

Figure 12:
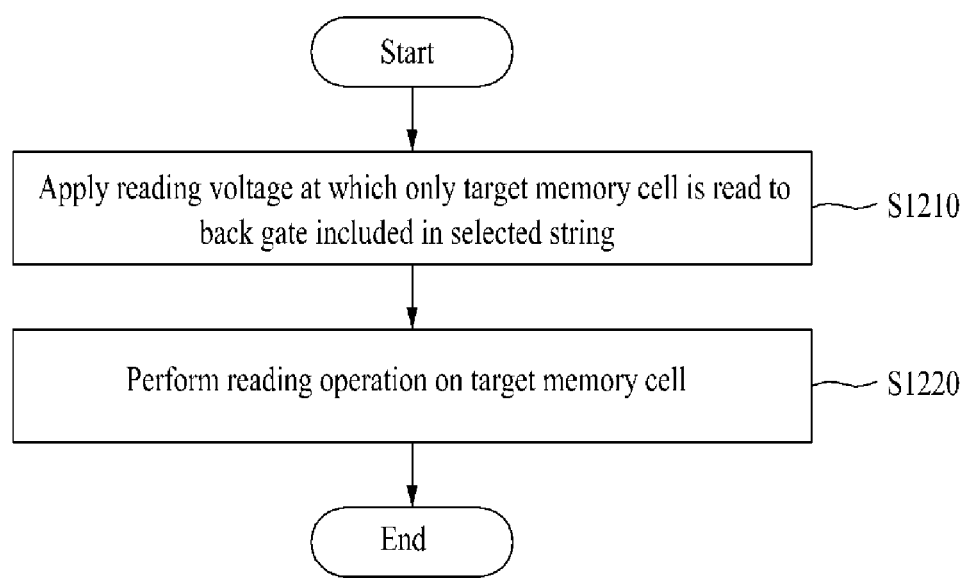
FIG. 12 is a flowchart illustrating a reading operation of the three-dimensional flash memory according to another embodiment.
Figure 13:
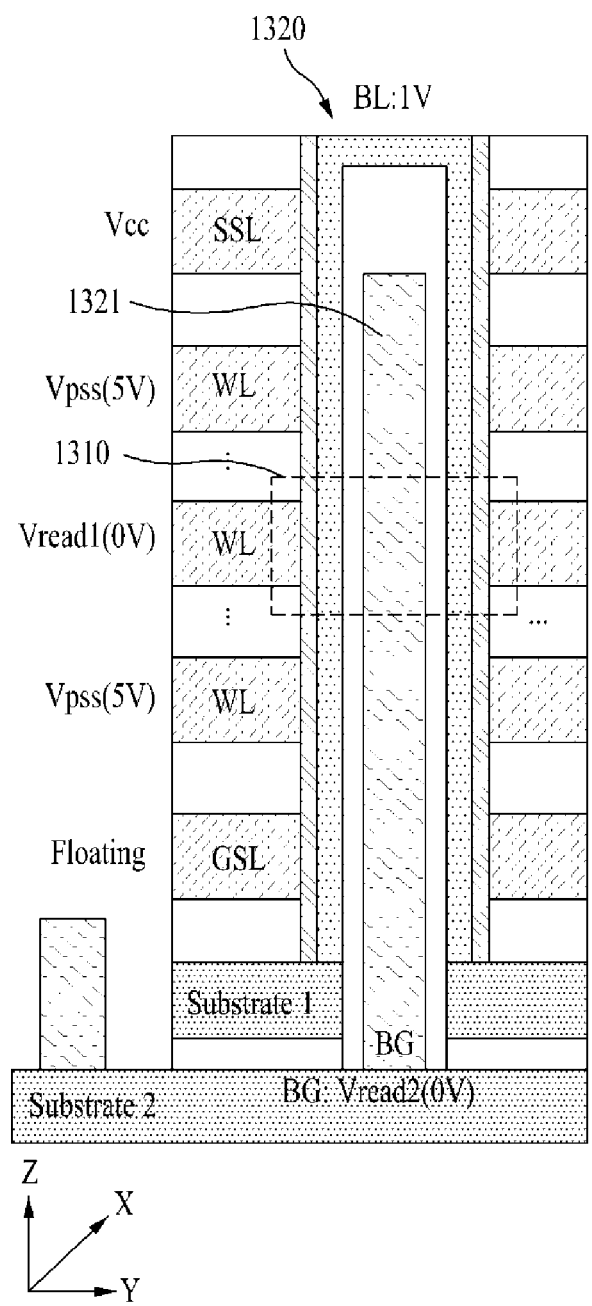
FIG. 13 is a Y-Z cross-sectional view for describing the reading operation of the three-dimensional flash memory according to another embodiment.

FIG. 12 is a flowchart illustrating a reading operation of the three-dimensional flash memory according to another embodiment, and FIG. 13 is a Y-Z cross-sectional view for describing the reading operation of the three-dimensional flash memory according to another embodiment. Hereinafter, the described reading operation is assumed to be performed by the three-dimensional flash memory in which the insulating film has the same EOT as the ferroelectric layer. In this way, due to characteristics of the insulating film having the same EOT as the ferroelectric layer, in the three-dimensional flash memory, the back gate may correspond to gates such as the plurality of word lines and may be used more efficiently than the above-described back gate structure, and thus, the three-dimensional flash memory can be interpreted as having a dual gate structure.

Referring to FIGS. 12 and 13, in operation S1210, in the three-dimensional flash memory, in a reading operation on a selected string 1320 including a target memory cell 1310 that is subjected to the reading operation, a reading voltage Vread2 (for example, 0 V) for reading only the target memory cell 1310 may be applied to a back gate 1321 included in the selected string 1320 on the basis of a Vread1 (for example, 0 V) applied to a word line corresponding to the target memory cell 1310 among the plurality of word lines, the pass voltage Vpass (for example, 5 V) applied to at least one word line corresponding at least one other memory cell except for the target memory cell 1310 among the plurality of word lines, and a voltage (for example, 1 V) applied to a bit line connected to the selected string 1320.

In more detail, in the three-dimensional flash memory, during the reading operation, for the selected string 1320 including the target memory cell 1310, in operation S1210, the power supply voltage Vcc may be applied to the SSL, the reading voltage Vread1 (for example, 0 V) may be applied to the word line corresponding to the target memory cell 1310, the pass voltage Vpass (for example, 5 V) may be applied to the at least one word line corresponding to the at least other memory cell, the GSL and the CSL may float, and a voltage of 1 V may be applied to the bit line connected to the selected string 1320. In response to this, in the three-dimensional flash memory, the reading voltage Vread2 (for example, 0 V) may be applied even to the back gate 1321 included in the selected string 1320.

In this case, a voltage application method in the non-selected string described above with reference to FIGS. 10 and 11 may be equally applied to at least one non-selected string (not illustrated) except for the selected string 1320 among the plurality of strings. Thus, a detailed description thereof will be omitted.

Thus, in operation S1220, in the three-dimensional flash memory, in response that the voltages are applied as in operation S1210 (in response that a voltage of 1 V is applied to the bit line connected to the selected string 1320, and at the same time, the reading voltages are applied to both the word line and the back gate 1321 corresponding to the target memory cell 1310), the reading operation on the target memory cell 1310 included in the selected string 1320 may be performed. Likewise, a plurality of memory cells included in the at least one non-selected string may not be read.

In this way, the reading operation according to an embodiment is based on a dual gate method of using the back gate 1321 as well as the plurality of word lines as a gate, so that a reading operation speed and a reading operation current can be improved, and thus the cell characteristics and reliability can be improved.

A method of manufacturing a three-dimensional flash memory, which will be described below, is based on the premise that the method is performed by an automated and mechanized manufacturing system and means the method of manufacturing a three-dimensional flash memory described with reference to FIGS. 3A and 3B, but the present disclosure is not limited thereto, and the method may be also applied as the method of manufacturing a three-dimensional flash memory described with reference to FIGS. 4A to 4D, 5A, and 5B Further, in the drawing for the method of manufacturing a three-dimensional flash memory, which will be described below, for convenience of description, the plurality of strings are illustrated as one string.

Figure 14:
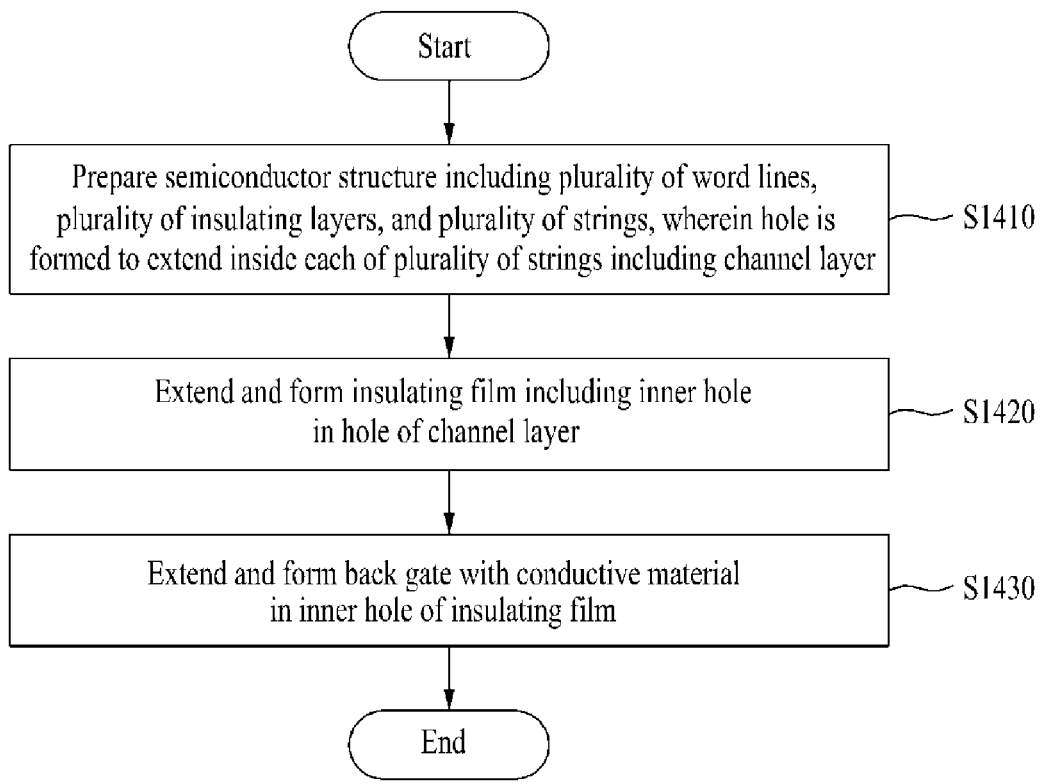
FIG. 14 is a flowchart illustrating a method of manufacturing the three-dimensional flash memory according to an embodiment.

FIG. 14 is a flowchart illustrating a method of manufacturing the three-dimensional flash memory according to an embodiment, FIGS. 15A to 15D are Y-Z cross-sectional views for describing a first implementation of the method for manufacturing the three-dimensional flash memory illustrated in FIG. 14, and FIGS. 16A and 16B are Y-Z cross-sectional views for describing a second implementation of the method for manufacturing the three-dimensional flash memory illustrated in FIG. 14.

Referring to FIG. 14, in operation S1410, a manufacturing system may prepare a semiconductor structure.

Figure 15A:
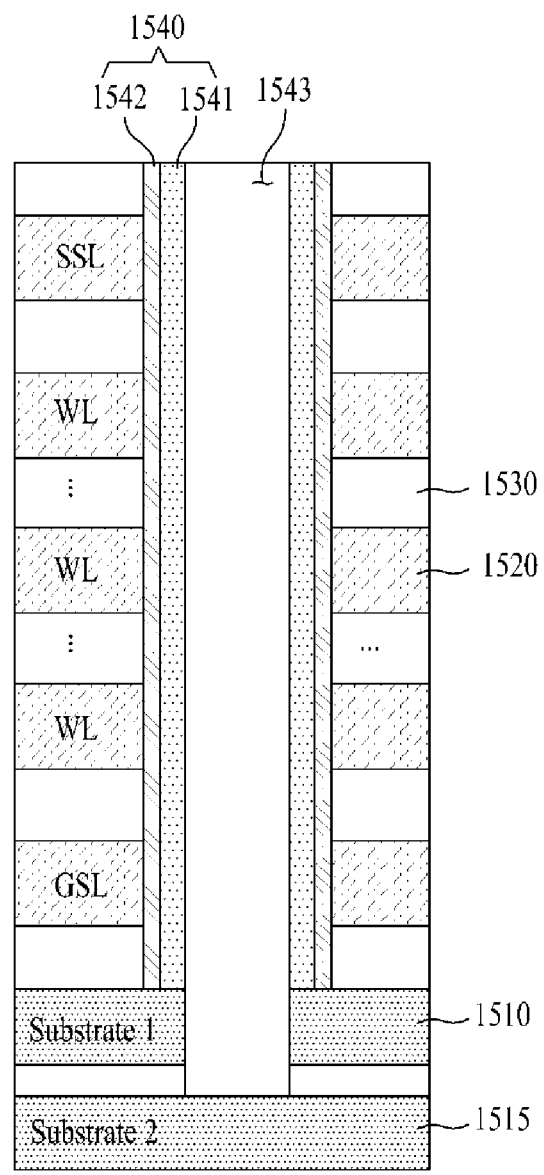

For example, as illustrated in FIG. 15A, the manufacturing system may prepare a semiconductor structure including a plurality of word lines 1520 extending in a horizontal direction on a substrate 1510 and sequentially stacked, a plurality of insulating layers 1530 alternately stacked between the plurality of word lines 1520, and a plurality of strings 1540 extending in the one direction (for example, the Z direction) on the substrate 1510 through the plurality of insulating layers 1530 and the plurality of word lines 1520.

In this case, in the semiconductor structure, each of the plurality of strings 1540 may include a channel layer 1541 extending in the one direction (for example, the Z direction) and a ferroelectric layer 1542 extending in the one direction to surround the channel layer 1541, and a hole 1543 may extend in the one direction (for example, the Z direction) inside the channel layer 1541.

Further, the semiconductor structure may further include a substrate 1515 for a back gate 1560 positioned below the substrate 1510 in which the plurality of strings 1540 extend. Accordingly, the hole 1543 inside the channel layer 1541 may extend up to the substrate 1515 for the back gate 1560 while passing through the substrate 1510 in which the plurality of strings 1540 extend.

Figure 15B:
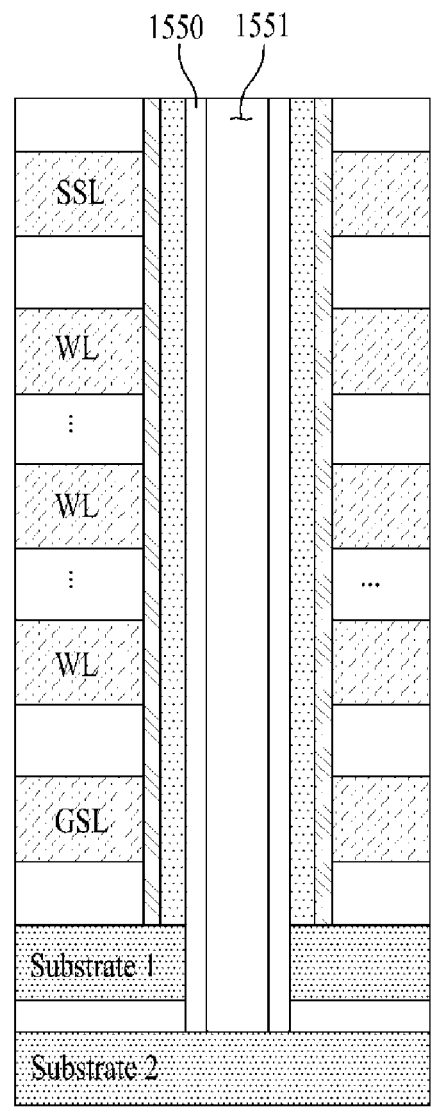

Next, in operation S1420, as illustrated in FIG. 15B, the manufacturing system may form an insulating film 1550 including an inner hole 1551 inside the hole 1543 and extending in the one direction.

Next, in operation S1430, the manufacturing system may form the back gate 1560 extending in the one direction inside the inner hole 1551 of the insulating film 1550 and made of a conductive material or doped polysilicon. Here, the back gate 1560 may be a component to which the pass voltage for forming a channel in the channel layer 1541 or boosting the channel layer 1541 is applied.

Figure 15D:
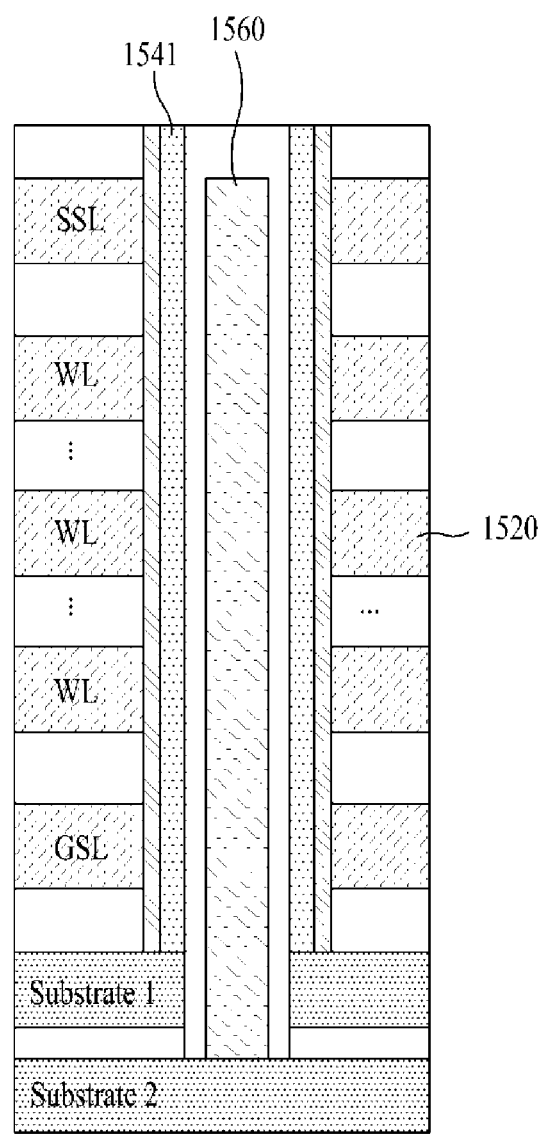

In operation S1430, as illustrated in FIG. 15C, the back gate 1560 may extend to a region of the plurality of word lines 1520 at a lower end of the SSL in the inside of the channel layer 1541, but the present disclosure is not limited thereto, and as illustrated in FIG. 15D, the back gate 1560 may extend to a region of the SSL in the inside of the channel layer 1541.

Although not illustrated as a separate operation in FIG. 14, the manufacturing system may form a drain region above the plurality of strings 1540 after operation S1430.

In this way, the method of manufacturing a three-dimensional flash memory according to an embodiment is a method using a semiconductor structure in which the hole 1543 extends inside the channel layer 1541, and the semiconductor structure used may be manufactured in advance as illustrated in FIGS. 16A and 16B. For example, the manufacturing system may prepare the semiconductor structure in operation S1410 by, as illustrated in FIG. 16B, sequentially stacking a lower semiconductor structure and an upper semiconductor structure prepared as illustrated in FIG. 16A.

Figure 17:
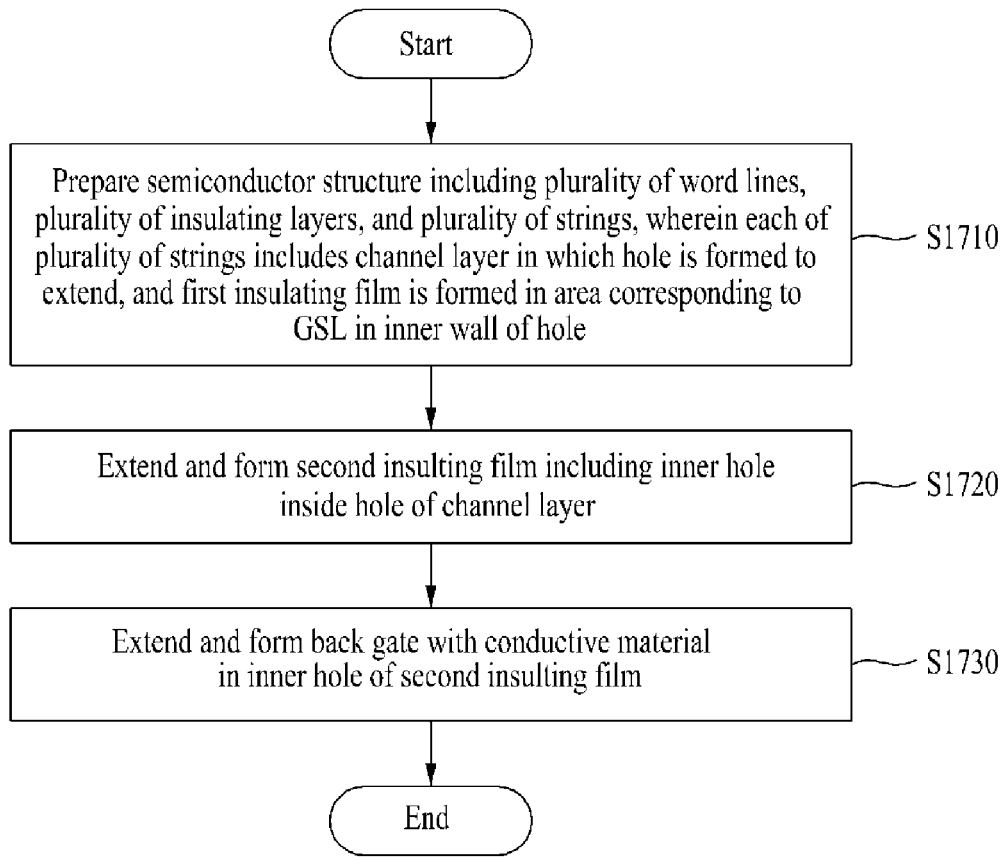
FIG. 17 is a flowchart illustrating a method of manufacturing the three-dimensional flash memory according to another embodiment.

FIG. 17 is a flowchart illustrating a method of manufacturing the three-dimensional flash memory according to another embodiment, and FIGS. 18A to 18K are Y-Z cross-sectional views for describing an implementation of the method for manufacturing the three-dimensional flash memory illustrated in FIG. 17.

Referring to FIG. 17, in operation S1710, the manufacturing system may prepare a semiconductor structure.

Figure 18A:
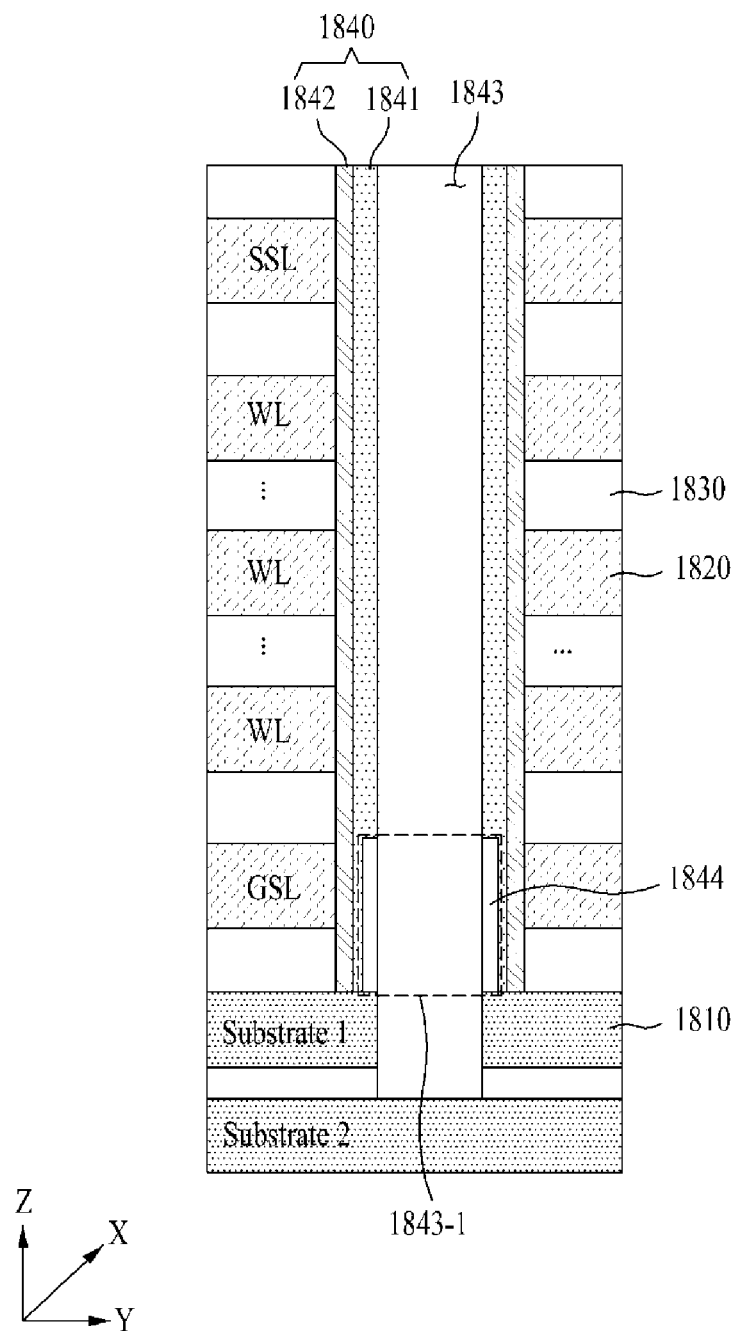

For example, as illustrated in FIG. 18A, the manufacturing system may prepare a semiconductor structure including a plurality of word lines 1820 extending in a horizontal direction on a substrate 1810 and sequentially stacked, a plurality of insulating layers 1830 alternately stacked between the plurality of word lines 1820, and a plurality of strings 1840 extending in the one direction (for example, the Z direction) on the substrate 1810 through the plurality of insulating layers 1830 and the plurality of word lines 1820.

In this case, in the semiconductor structure, each of the plurality of strings 1840 may include a channel layer 1841 extending in the one direction (for example, the Z direction) and a ferroelectric layer 1842 extending in the one direction to surround the channel layer 1841, and a hole 1843 may extend in the one direction (for example, the Z direction) inside the channel layer 1841.

Figure 18B:
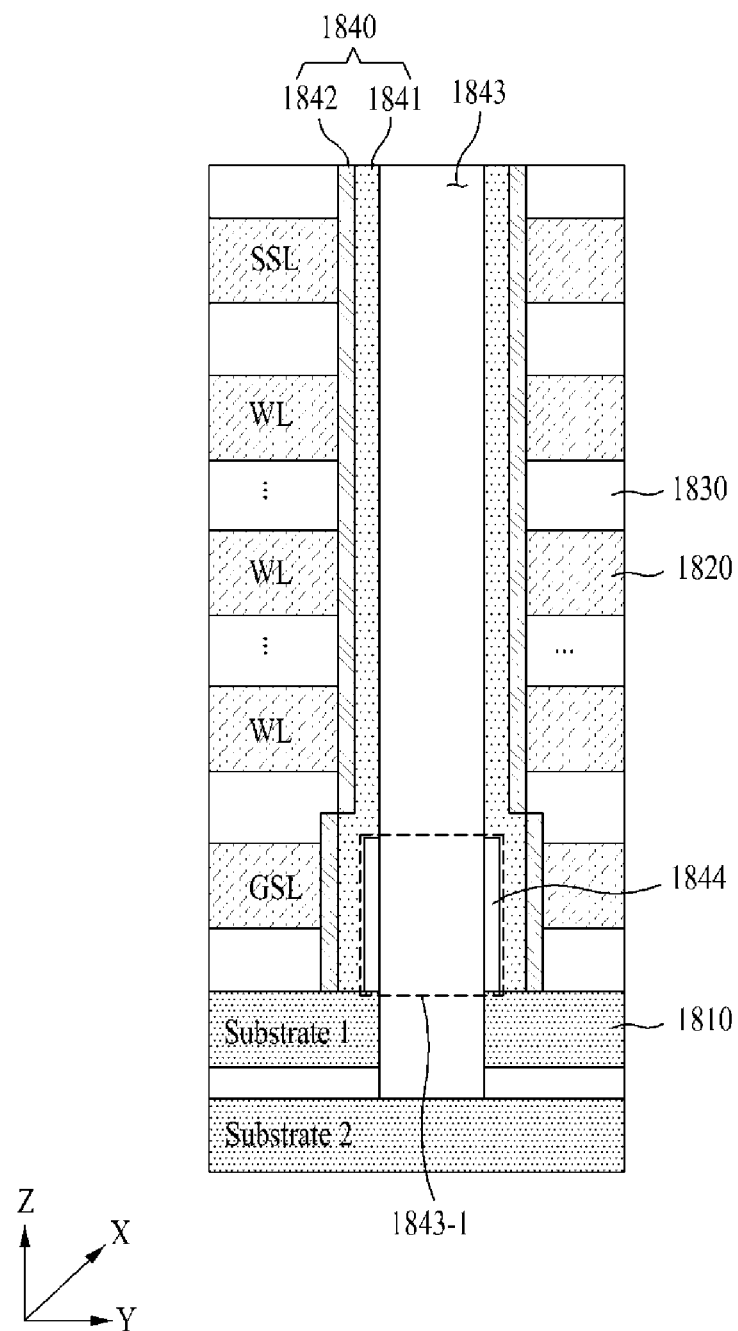

In particular, a first insulating film 1844 may be formed in a region 1843-1 corresponding to the GSL in an inner wall of the hole 1843, and furthermore, a region corresponding to the GSL among the region of the channel layer 1841 may have a greater cross section than the other region as illustrated in FIG. 18B. Hereinafter, the method of manufacturing the three-dimensional flash memory will be described as manufacturing the three-dimensional flash memory having a structure in which the region corresponding to the GSL among the region of the channel layer 1841 has a greater cross section than the other region.

Figure 18C:
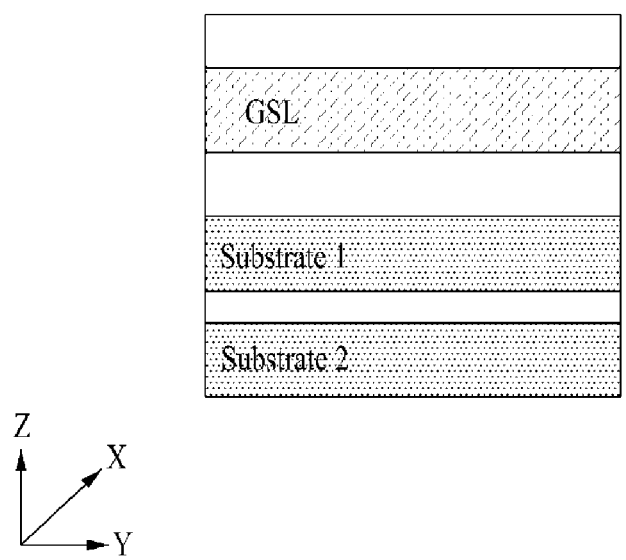
Figure 18D:
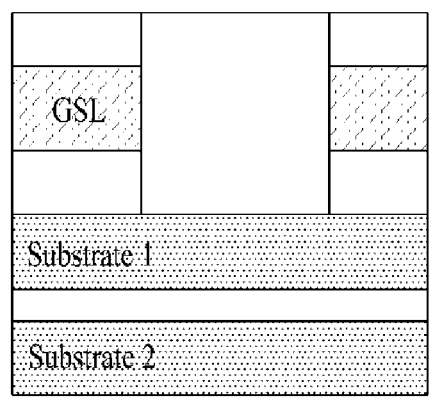
Figure 18E:
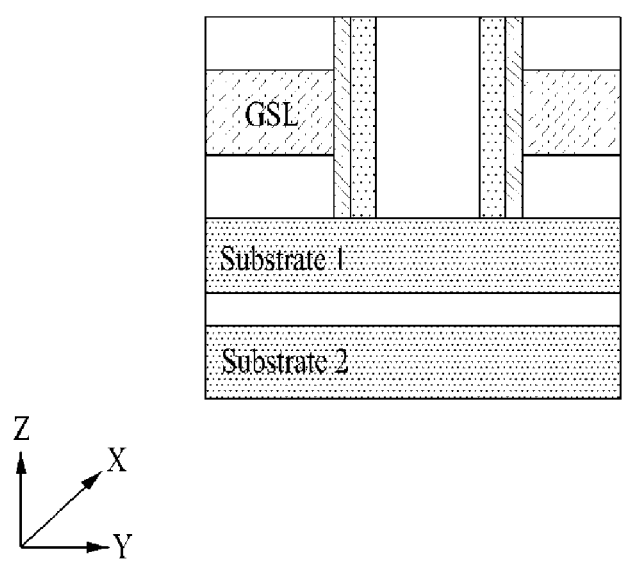
Figure 18G:
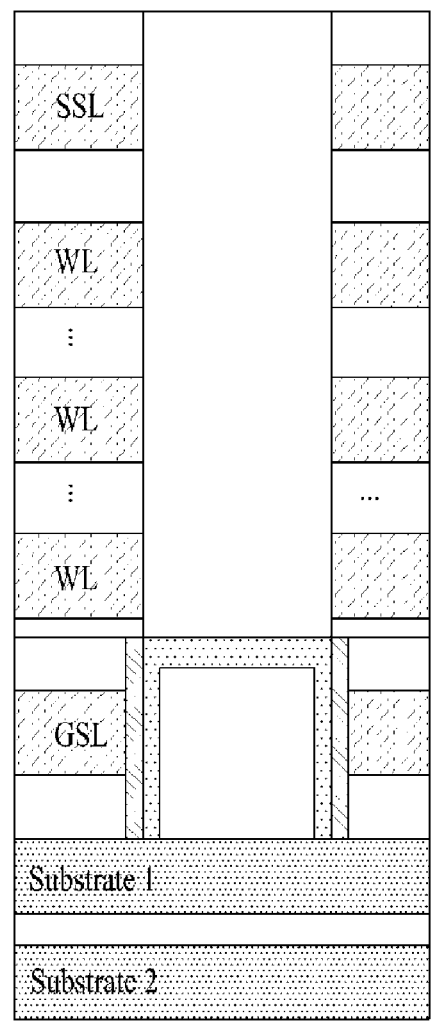
Figure 18H:
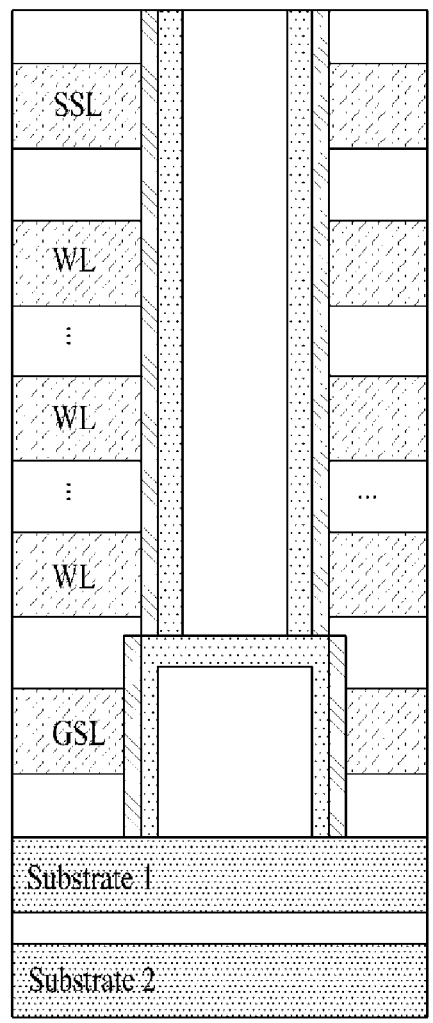
Figure 18I:
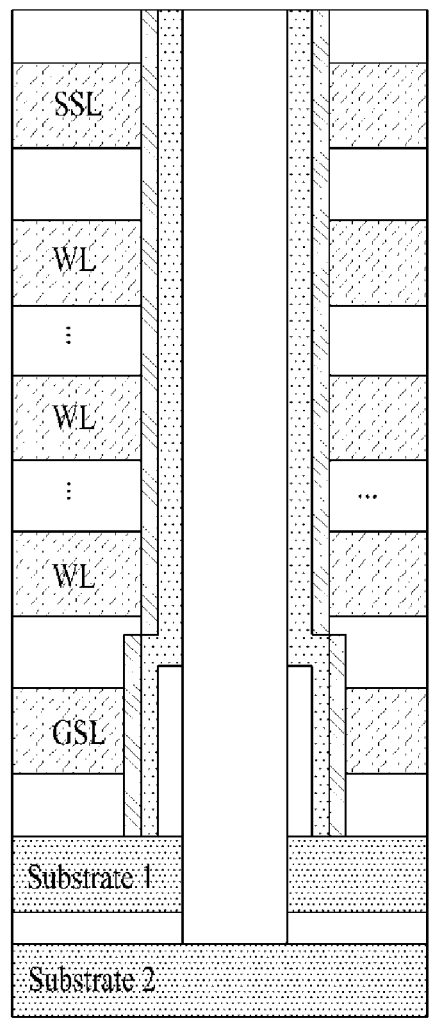

Such a semiconductor structure may be prepared through a process of FIGS. 18C to 181.

Further, the semiconductor structure may further include a substrate 1815 for a back gate 1860 positioned below the substrate 1810 in which the plurality of strings 1840 extend. Accordingly, the hole 1843 inside the channel layer 1841 may extend up to the substrate 1815 for the back gate 1860 while passing through the substrate 1810 in which the plurality of strings 1840 extend.

Figure 18J:
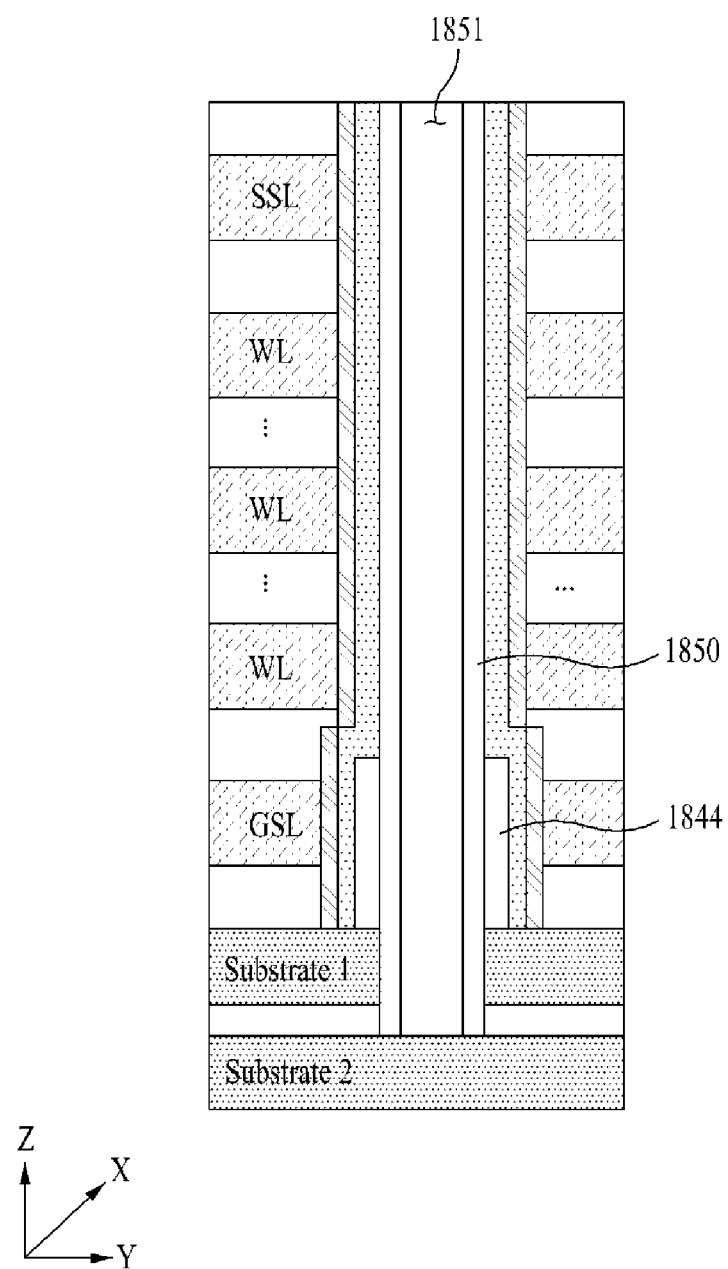

Next, in operation S1720, as illustrated in FIG. 18J, the manufacturing system may form a second insulating film 1850 including an inner hole 1851 inside the hole 1843 and extending in the one direction.

Figure 18K:
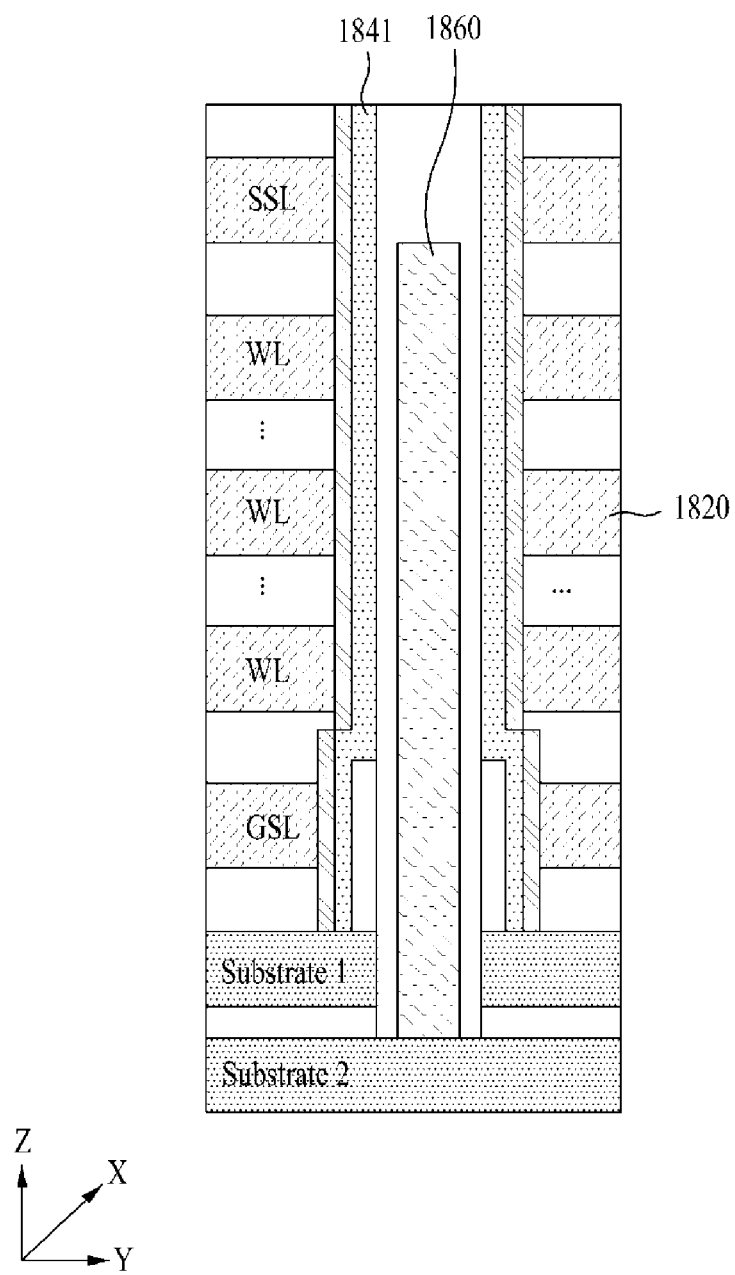

Thereafter, in operation S1730, as illustrated in FIG. 18K, the manufacturing system may form the back gate 1860 extending in the one direction inside the inner hole 1851 of the second insulating film 1850 and made of a conductive material or doped polysilicon. Here, the back gate 1860 may be a component to which the pass voltage for forming a channel in the channel layer 1841 or boosting the channel layer 1841 is applied.

Hereinabove, in operation S1730, it has been described that the back gate 1860 may extend to a region of the plurality of word lines 1820 at the lower end of the SSL in the inside of the channel layer 1841, but the present disclosure is not limited thereto, and as described above, the back gate 1860 may extend to the region of the SSL in the inside of the channel layer 1841.

Further, in operation S1730, a drain region may be formed above the plurality of strings 1840.

In this way, the method of manufacturing the three-dimensional flash memory according to another embodiment is a method for manufacturing a structure in which a thickness of the region corresponding to the GSL among the region of the insulating film has a greater thickness than the other region, and the semiconductor structure (more accurately, the semiconductor structure in operation S1710) used in the corresponding method can be prepared through the processes of FIG. 18C to FIG. 18J.

FIG. 19 is a flowchart illustrating a method of manufacturing a three-dimensional flash memory according to still another embodiment, and FIGS. 20A to 20D are Y-Z cross-sectional views for describing the method for manufacturing the three-dimensional flash memory illustrated in FIG. 19.

Referring to FIG. 19, in operation S1910, the manufacturing system may prepare a semiconductor structure.

Figure 20A:
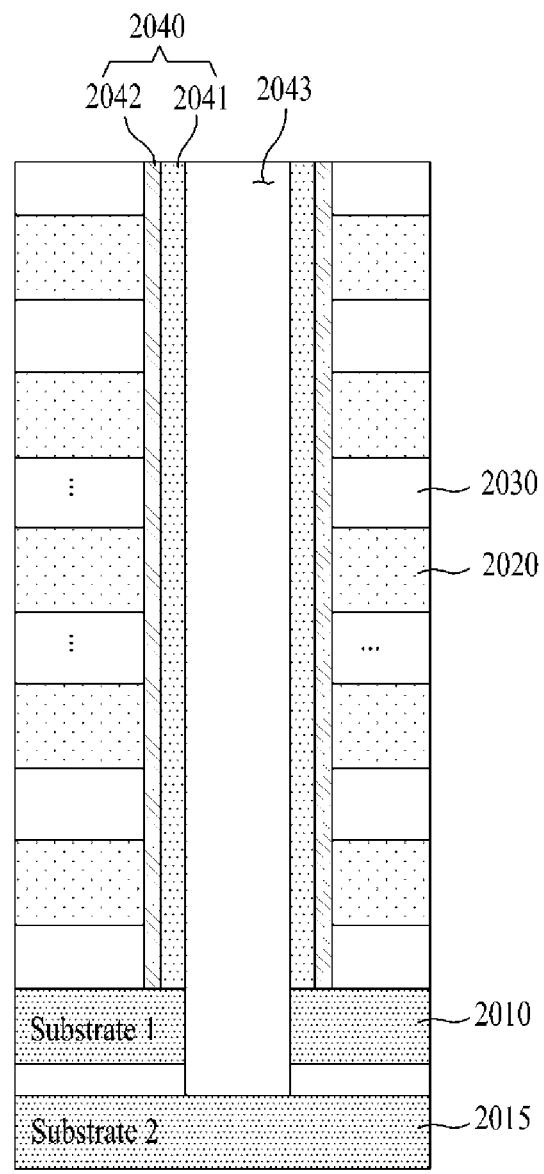
FIGS. 20A to 20D are Y-Z cross-sectional views for describing a method for manufacturing the three-dimensional flash memory illustrated in FIG. 19.

For example, as illustrated in FIG. 20A, the manufacturing system may prepare a semiconductor structure including a plurality of sacrificial layers 2020 extending in a horizontal direction on a substrate 2010 and sequentially stacked, a plurality of insulating layers 2030 alternately stacked between the plurality of sacrificial layers 2020, and a plurality of strings 2040 extending in the one direction (for example, the Z direction) on the substrate 2010 through the plurality of insulating layers 2030 and the plurality of sacrificial layers 2020.

In this case, in the semiconductor structure, each of the plurality of strings 2040 may include a channel layer 2041 extending in the one direction (for example, the Z direction) and a ferroelectric layer 2042 extending in the one direction to surround the channel layer 2041, and a hole 2043 may extend in the one direction (for example, the Z direction) inside the channel layer 2041.

Further, the semiconductor structure may further include a substrate 2015 for a back gate 2060 positioned below the substrate 2010 in which the plurality of strings 2040 extend. Accordingly, the hole 2043 inside the channel layer 2041 may extend up to the substrate 2015 for the back gate 2060 while passing through the substrate 2010 in which the plurality of strings 2040 extend.

Figure 20B:
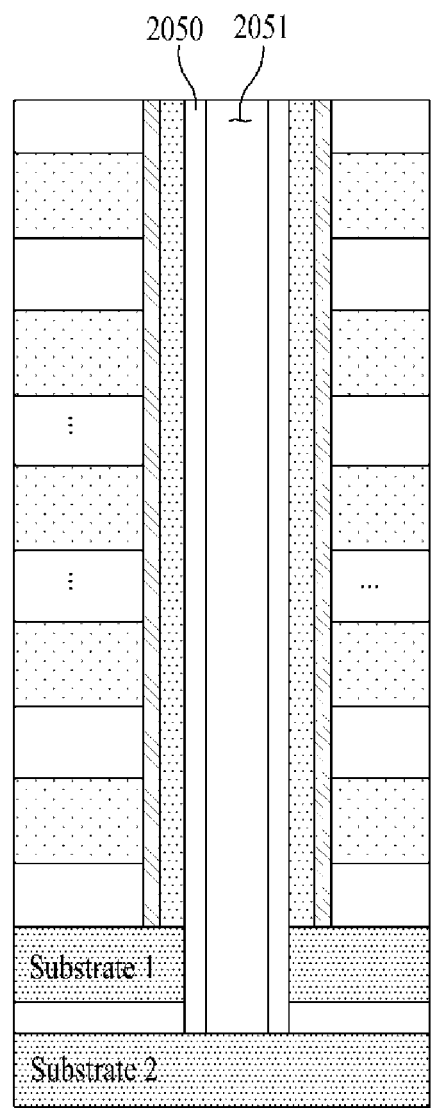

Next, in operation S1920, as illustrated in FIG. 20B, the manufacturing system may form an insulating film 2050 including an inner hole 2051 inside the hole 2043 and extending in the one direction.

Figure 20C:
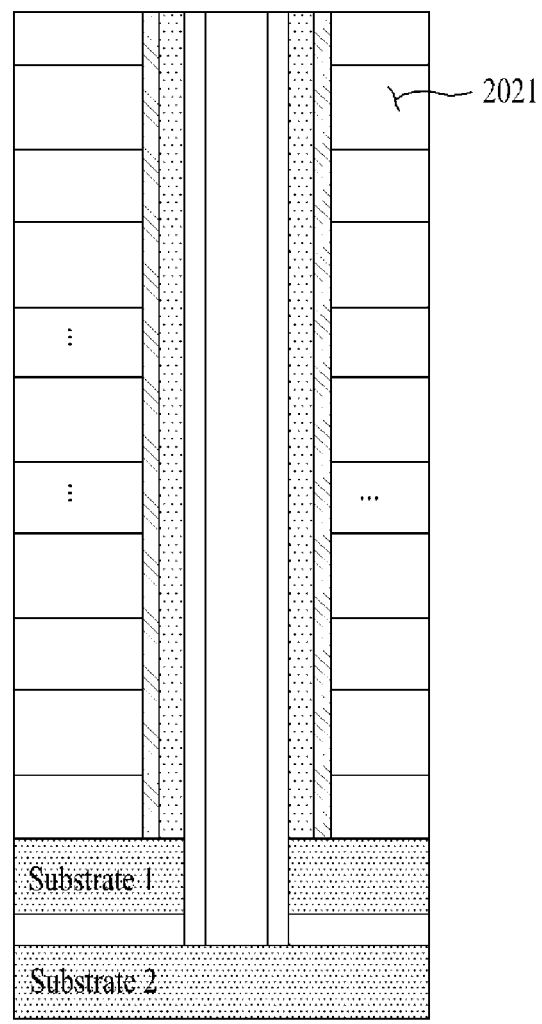

Next, in operation S1930, as illustrated in FIG. 20C, the manufacturing system may remove the plurality of sacrificial layers 2020.

Figure 20D:
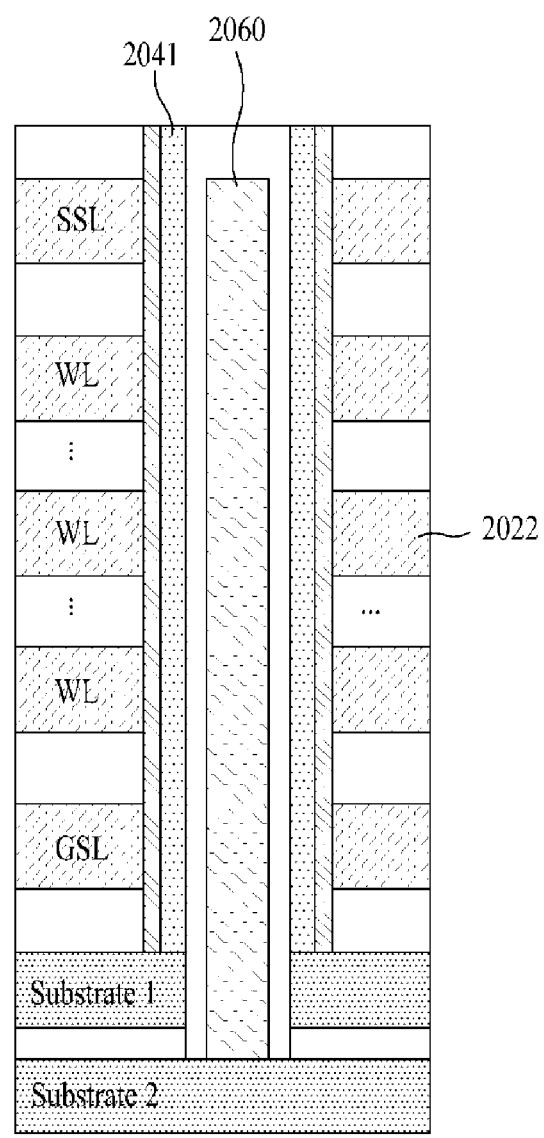

Thereafter, in operation S1940, as illustrated in FIG. 20D, the manufacturing system may form a plurality of word lines 2022 using a conductive material in a space 2021 from which the plurality of sacrificial layers 2020 are removed and form the back gate 2060 positioned in the inner hole 2051 of the insulating film 2050 using a conductive material and extending in the one direction. In particular, in operation S1940, the forming of the plurality of word lines 2022 using the conductive material in the space 2021 from which the plurality of sacrificial layers 2020 are removed and the forming of the back gate 2060 positioned in the inner hole 2051 of the insulating film 2050 using the conductive material and extending in the one direction are performed simultaneously.

Here, the back gate 2060 may be a component to which the pass voltage for forming a channel in the channel layer 2041 or boosting the channel layer 2041 is applied.

Hereinabove, in operation S1940, it has been described that the back gate 2060 may extend from the inside of the channel layer 2041 to a region of the plurality of word lines 2022 at the lower end of the SSL in the inside of the channel layer 2041, but the present disclosure is not limited thereto, and as described above, the back gate 1860 may extend to the region of the SSL in the inside of the channel layer 2041.

Further, in operation S1940, a drain region may be formed above the plurality of strings 2040.

In this way, the method of manufacturing the three-dimensional flash memory according to still another embodiment is a method of simultaneously forming the plurality of word lines 2022 and the back gate 2060, and the other process may be the same as the method of manufacturing the three-dimensional flash memory described above with reference to FIG. 14.

Figure 21:
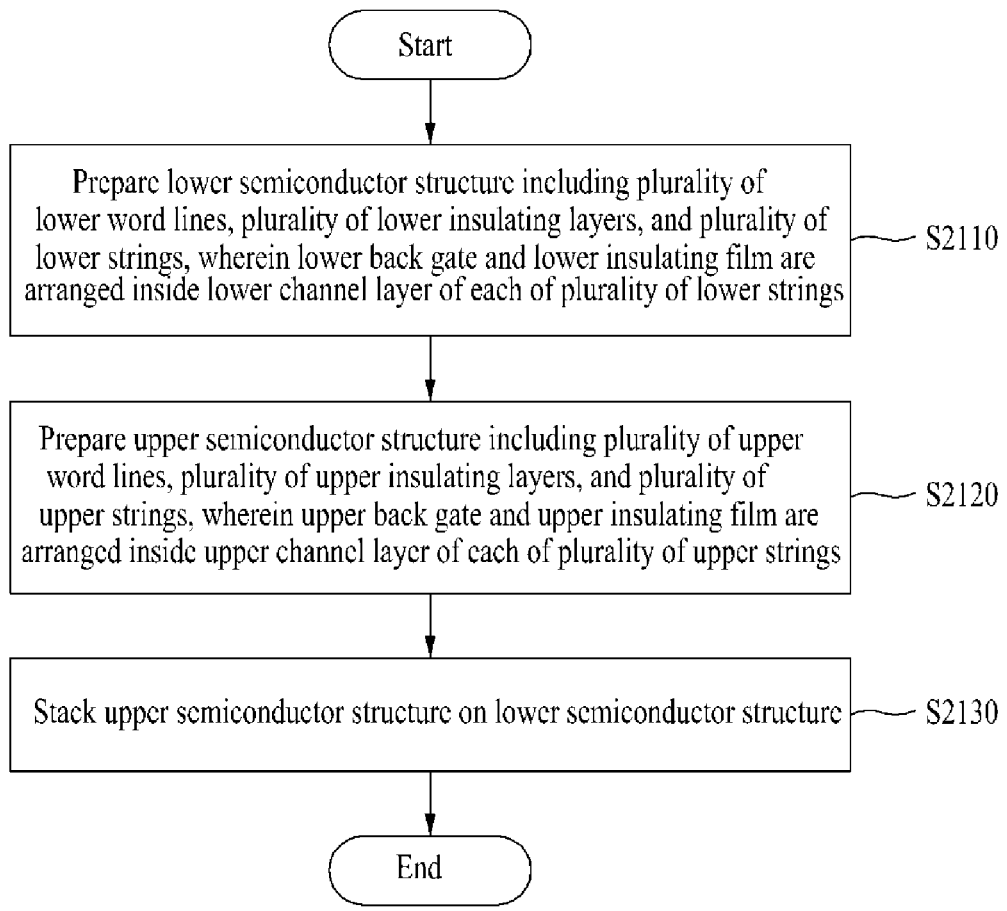
FIG. 21 is a flowchart illustrating a method of manufacturing a three-dimensional flash memory according to yet another embodiment.
Figure 22A:
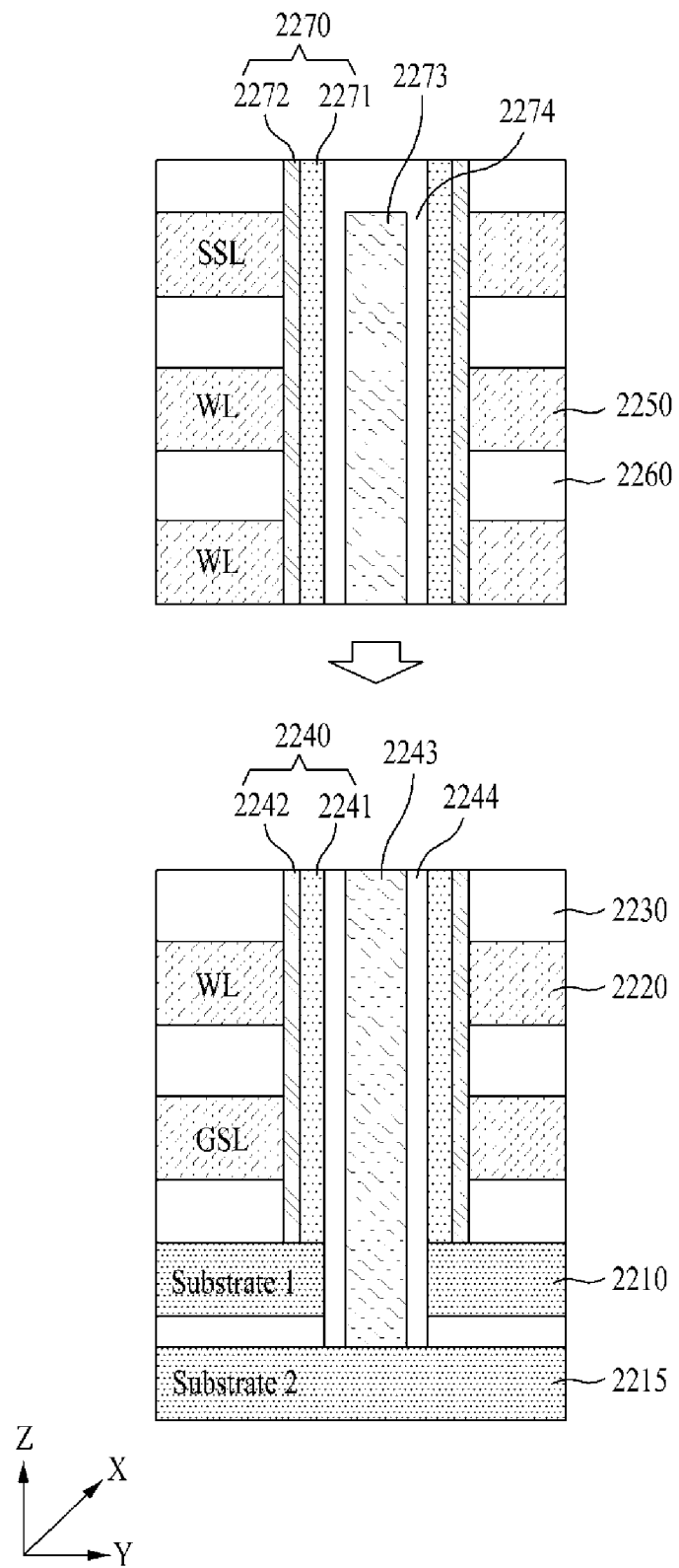
FIGS. 22A and 22B are Y-Z cross-sectional views for describing an implementation of the method for manufacturing the three-dimensional flash memory illustrated in FIG. 21.
Figure 22B:
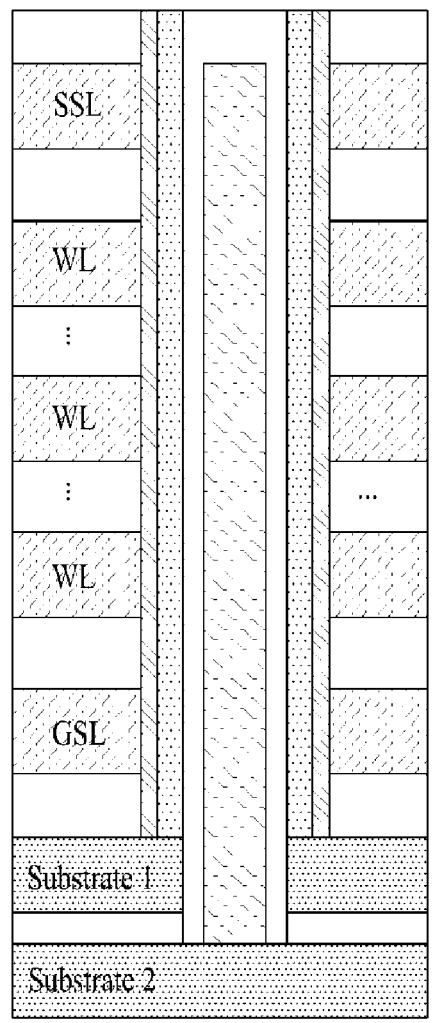

FIG. 21 is a flowchart illustrating a method of manufacturing a three-dimensional flash memory according to yet another embodiment, and FIGS. 22A and 22B are Y-Z cross-sectional views for describing an implementation of the method for manufacturing the three-dimensional flash memory illustrated in FIG. 21.

Referring to FIG. 21, in operation S2110, the manufacturing system may prepare a lower semiconductor structure.

For example, as illustrated in FIG. 22A, the manufacturing system may prepare a semiconductor structure including a plurality of lower word lines 2220 extending in a horizontal direction on a substrate 2210 and sequentially stacked, a plurality of lower insulating layers 2230 alternately stacked between the plurality of lower word lines 2220, and a plurality of lower strings 2240 extending in the one direction (for example, the Z direction) on the substrate 2210 through the plurality of lower insulating layers 2230 and the plurality of lower word lines 2220.

In this case, in the semiconductor structure, each of the plurality of lower strings 2240 may include a lower channel layer 2241 extending in the one direction (for example, the Z direction) and a lower ferroelectric layer 2242 extending in the one direction (for example, the Z direction) to surround the lower channel layer 2241. In particular, a lower back gate 2243 extending in the one direction (for example, the Z direction) and a lower insulating film 2244 extending in the one direction (for example, the Z direction) to surround the lower back gate 2243 may be arranged inside the lower channel layer 2241.

Further, the lower semiconductor structure may further include a substrate 2215 for the lower back gate 2243 positioned below the substrate 2210 in which the plurality of strings 2240 extend. Accordingly, the lower back gate 2243 and the lower insulating film 2244 inside the lower channel layer 2241 may extend up to the substrate 2215 for the back gate 2243 while passing through the substrate 2210 in which the plurality of strings 2240 extend.

Next, in operation S2120, the manufacturing system may prepare an upper semiconductor structure.

For example, as illustrated in FIG. 22A, the manufacturing system may prepare a semiconductor structure including a plurality of upper word lines 2250 extending in a horizontal direction and sequentially stacked, a plurality of upper insulating layers 2260 alternately stacked between the plurality of upper word lines 2250, and a plurality of upper strings 2270 extending in the one direction (for example, the Z direction) through the plurality of upper insulating layers 2260 and the plurality of upper word lines 2250.

In this case, in the semiconductor structure, each of the plurality of upper strings 2270 may include an upper channel layer 2271 extending in the one direction (for example, the Z direction) and an upper ferroelectric layer 2272 extending in the one direction (for example, the Z direction) to surround the upper channel layer 2271. In particular, an upper back gate 2273 extending in the one direction (for example, the Z direction) and an upper insulating film 2274 extending in the one direction (for example, the Z direction) to surround the upper back gate 2273 may be arranged inside the upper channel layer 2271.

Thereafter, in operation S2130, as illustrated in FIG. 22B, the manufacturing system may stack the upper semiconductor structure on the lower semiconductor structure so that a cross section of the lower back gate 2243 and a cross section of the upper back gate 2273 coincide with each other.

In this way, the method of manufacturing the three-dimensional flash memory according to yet another embodiment may be a method using the semiconductor structures (the lower semiconductor structure and the upper semiconductor structure) in which all components including the back gates 2243 and 2273 are formed.

As described above, although the embodiments have been described with reference to the limited embodiments and the limited drawings, various modifications and changes may be made based on the above description by those skilled in the art. For example, even though the described technologies are performed in an order different from the described method, and/or the described components such as a system, a structure, a device, and a circuit are coupled or combined in a form different from the described method or are replaced or substituted by other components or equivalents, appropriate results may be achieved.

Therefore, other implementations, other embodiments, and those equivalent to the appended claims also belong to the scope of the appended claims.

The invention claimed is:

1. A three-dimensional flash memory comprising:
a plurality of word lines extending in a horizontal direction on a substrate and sequentially stacked; and a plurality of strings extending in one direction on the substrate through the plurality of word lines, each of the plurality of strings including
  a channel layer extending in the one direction and a ferroelectric layer extending in the one direction to surround the channel layer, and
  a back gate extending in the one direction and an insulating film extending in the one direction to surround the back gate being arranged inside the channel layer,
wherein the channel layer and the ferroelectric layer constitute one memory cell of a plurality of memory cells corresponding to the plurality of word lines,
wherein the ferroelectric layer is configured to store data by changing and maintaining states of charges while being formed of a ferroelectric material, and
wherein, in an erasure operation associated with a target memory cell of the plurality of memory cells in a selected string among the plurality of strings, the plurality of word lines are configured to receive an erase voltage, a bit line of the selected string is configured to receive a ground voltage, the back gate of the target memory cell is configured to be in a floating state, and the back gate of at least memory cell of the plurality of memory cells in a non-selected string among the plurality of strings adjacent to the selected string is configured to receive a pass voltage.

2. The three-dimensional flash memory of claim 1, wherein the back gate is configured to apply a voltage for changing and maintain the states of charges of the ferroelectric layer in a memory operation of the three-dimensional flash memory.

3. The three-dimensional flash memory of claim 2, wherein the back gate, which is included in each of the plurality of strings, is configured to receive the pass voltage that allows only the target memory cell to be programmed during a program operation of the three-dimensional flash memory based on application of a negative program voltage to a word line corresponding to the target memory cell subjected to the program operation among the plurality of word lines and voltages applied to a plurality of bit lines respectively connected to the plurality of strings.

4. The three-dimensional flash memory of claim 3, wherein, during the program operation, at least one word line corresponding to at least one other memory cell except for the target memory cell among the plurality of word lines is configured to float based on application of the pass voltage to the back gate.

5. The three-dimensional flash memory of claim 2, wherein, during a reading operation of the three-dimensional flash memory:
  the back gate, which is included in the selected string including the target memory cell, is configured to receive a negative voltage at which only the target memory cell is read that is subjected to the reading operation among the plurality of strings based on application of a reading voltage to a word line corresponding to the target memory cell among the plurality of word lines;
  to at least one word line corresponding to at least one other memory cell except for the target memory cell among the plurality of word lines is configured to receive the pass voltage; and
  the bit line connected to the selected string is configured to receive a voltage.

6. The three-dimensional flash memory of claim 2, wherein, during a reading operation of the three-dimensional flash memory:
  the back gate, which is included in the selected string including the target memory cell that is subjected to the reading operation among the plurality of strings, is configured to float so that only the target memory cell is read based on application of a reading voltage to a word line corresponding to the target memory cell among the plurality of word lines;
  at least one word line corresponding to at least one other memory cell except to the target memory cell among the plurality of word lines is configured to receive the pass voltage; and
  the bit line connected to the selected string is configured to receive a voltage.

7. The three-dimensional flash memory of claim 5, wherein at least one back gate, which is included in at least one non-selected string except for the selected string among the plurality of strings during the reading operation based on application of the reading voltage to the word line corresponding to the target memory cell among the plurality of word lines, is configured to receive the pass voltage that prevents memory cells included in the at least one non-selected string from being read, and
wherein at least one word line corresponding to at least one other memory cell except for the target memory cell among the plurality of word lines is configured to receive the pass voltage, and
wherein at least one bit line connected to the at least one non-selected string is configured to receive the voltage.

8. The three-dimensional flash memory of claim 2, wherein the insulating film has a same Equivalent Oxide Thickness (EOT) as an EOT of the ferroelectric layer.

9. The three-dimensional flash memory of claim 8, wherein, during a reading operation of the three-dimensional flash memory:
  the back gate, which is included in the selected string including the target memory cell that is subjected to the reading operation among the plurality of strings based on application of a reading voltage to a word line corresponding to the target memory cell among the plurality of word lines, is configured to receive the reading voltage at which only the target memory cell is read;
  at least one word line corresponding to at least one other memory cell except for the target memory cell among the plurality of word lines is configured to receive the pass voltage; and
  the bit line connected to the selected string is configured to receive a voltage.

* * * * *